US007456846B1

(12) United States Patent
King et al.

(10) Patent No.: US 7,456,846 B1
(45) Date of Patent: Nov. 25, 2008

(54) GRAPHICAL PROCESSING SYSTEM, GRAPHICAL PIPELINE AND METHOD FOR IMPLEMENTING SUBPIXEL SHIFTING TO ANTI-ALIAS TEXTURE

(75) Inventors: Gary C. King, San Jose, CA (US); Michael J. M. Toksvig, Palo Alto, CA (US)

(73) Assignee: Nvidia Corporation, Santa Clara ( * ) Notice: Subject to any disclaimer, the term of this patent is extended or adjusted under 35 U.S.C. 154(b) by 691 days.

(21) Appl. No.: 11/144,920

(22) Filed: Jun. 3, 2005

(51) Int. Cl.
*G09G 5/00* (2006.01)
(52) U.S. Cl. ..................................... 345/613
(58) Field of Classification Search ................. 345/611, 345/613
See application file for complete search history.

(56) References Cited

U.S. PATENT DOCUMENTS

| 6,720,975 B1 * | 4/2004 | Dietrich, Jr. ................. 345/611 |
| 7,369,140 B1 | 5/2008 | King et al. |
| 2003/0029212 A1 | 2/2003 | Im ................................. 72/54 |
| 2003/0117409 A1 * | 6/2003 | Lefebvre et al. ............. 345/581 |

OTHER PUBLICATIONS

U.S. Appl. No. 10/658,056, filed Sep. 8, 2003, Bastos, et al.
U.S. Appl. No. 10/960,857, filed Oct. 7, 2004, Bastos, et al.

* cited by examiner

*Primary Examiner*—Kee M Tung
*Assistant Examiner*—Aaron M Richer
(74) *Attorney, Agent, or Firm*—Cooley Godward Kronish LLP

(57) ABSTRACT

A system, apparatus, and method are disclosed for modifying positions of sample positions for selectably oversampling pixels to anti-alias non-geometric portions of computer-generated images, such as texture, at least in part, by shifting shading sample positions relative to a frame of reference. There is generally no relative motion between the geometries and the coverage sample positions. In one embodiment, an apparatus, such as a graphics pipeline and/or a general purpose graphics processing unit, anti-aliases geometries of a computer-generated object. The apparatus includes at least a texture unit and a pipeline front end unit to determine geometry coverage and a subpixel shifter to shift shading sample positions relative to the frame of reference. The apparatus can receive subpixel shifting masks to select subsets of shading sample positions. Each of the shading sample positions is shifted to a coverage sample position to reduce level of detail ("LOD") artifacts.

21 Claims, 16 Drawing Sheets

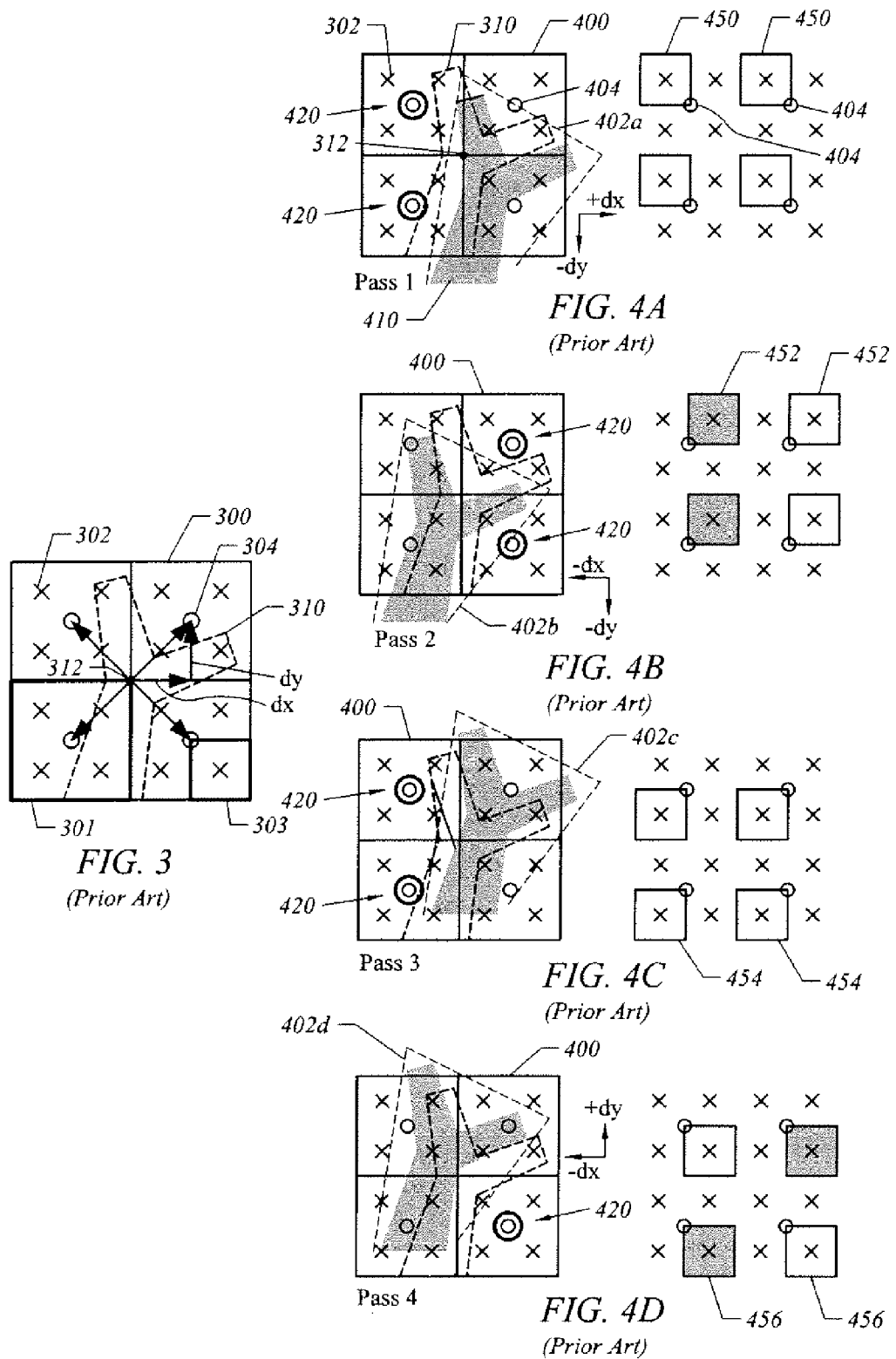

GRAPHICAL PROCESSING SYSTEM, GRAPHICAL PIPELINE AND METHOD FOR IMPLEMENTING SUBPIXEL SHIFTING TO ANTI-ALIAS TEXTURE

BRIEF DESCRIPTION OF THE INVENTION

This invention relates generally to computing systems and generating graphical images, and more particularly, to an apparatus for modifying positions of sample positions to selectably oversampling pixels to anti-alias non-geometric portions of computer-generated images, such as texture.

BACKGROUND OF THE INVENTION

A common problem in forming computer-generated images is aliasing, which is the under-sampling of a signal (or graphic feature) resulting in degraded image quality. For example, geometric aliasing causes a stair-stepping effect (or "jaggies") to appear on the geometric edges of primitives (or geometries). Non-geometric aliasing is another type of aliasing that is due primarily to under-sampling of texture, for example, or depth. Texture aliasing arises during the sampling of textures when screen coordinates of image pixels can irregularly map to more or fewer texture coordinates of texture pixels (i.e., "texels"). One general anti-aliasing approach is the technique of supersampling an entire frame. While providing higher resolutions with which to reduce aliasing, the conventional technique of supersampling has a drawback of increasing the computational overhead of rendering computer-generated images by a multiplicative amount. For example, a four-times (i.e., "4×") supersampling technique samples the texture (or shading) of each pixel of a frame four times. Unfortunately, this tends to decrease the frame rate of rendering computer-generated images, especially in shader limited and texture limited situations, to approximately a quarter of the frame rates achieved by other anti-aliasing techniques, such as multisampling. The reduction in frame rate is undesirable for real-time applications. The terms "texture limited" and "shader limited" refer generally to the fastest speed at which a graphics generating system can operate when respectively processing large textures and complicated shading that bottleneck the system.

FIG. 1 shows sampling of a pixel in accordance with multisampling as another conventional anti-aliasing technique. Multisampling reduces stair-casing effects by oversampling a pixel 100 to form four subpixels 102a to 102d. In turn, subpixels 102a to 102d respectively include coverage sample positions 104a to 104d, each of which are used to oversample, for example, geometric edges of geometries covering pixel 100. FIG. 1 identifies each of those coverage sample positions by an "X." While multisampling reduces geometric aliasing, it has a drawback of sampling shading at only one sample position—at pixel center 106. FIG. 1 identifies the shading sample position by a circle, or "O." Notably, multisampling samples the shading at pixel center 106 and then applies the shading to any subpixel of a geometry that covers pixel center 106. But with only one sample position to sample shading, multisampling does not suitably handle oversampling of non-geometric edges, examples of which arise during alpha-tested rendering when using a texture map to add texture to objects and their edges, as well as during the rendering of tight specular exponents (e.g., rendering flashes of light that reflects from a geometric surface).

FIGS. 2 to 4D are diagrams conveying another conventional anti-aliasing technique that repeatedly shifts geometries to new locations. Generally, this technique anti-aliases images by first generating a scene 202 and then repeatedly shifting each pixel of either scene 202 by an amount no greater than a size of a pixel. Each shift offsets or "jitters" an object and its scene so that its geometries shift relative to a number of sample positions that determines coverage and shading for each subpixel. "Jitter" is an amount of shifting that determines the subpixel locations (X,Y) of the samples for each shifted scene. As an example, consider that this technique adds jitter to anti-alias object 220. First, object 220 and its scene are shifted by an amount (e.g., dX=−0.25 pixels, dY=+0.25 pixels) to form shifted scene 204, with shifted scenes 206, 208 and 210 being formed in a similar manner. Combiner 212 receives sampled subpixels from each shifted scene and accumulates them to form a final image. One example of combiner 212 is an accumulation buffer.

FIGS. 3 and 4A to 4D illustrate further the implementation of the conventional jitter-based anti-aliasing technique set forth in FIG. 2. FIG. 3 shows a quad 300 of four pixels 301. Each pixel 301 includes coverage sample positions 302 and shading sample positions 304 for multisampling each pixel in this example. By adding jitter, this technique samples shading for each subpixel 303. Object 310 can represent, for example, a twig in a foreground layer for rendering quad 300. By adding jitter (i.e., ±dX, ±dY), a center point 312 of object 310 shifts to four different positions, each of which are shown in FIGS. 4A to 4D. By shifting object 310 (FIG. 3) over different, stationary shading sample positions 304 four times, the shading for object 310 is sampled four times, thereby providing for 4× non-geometric anti-aliasing.

FIG. 4A illustrates a shifted geometry 402a as a portion of a triangle being shifted from center point 312 by an amount +dX,−dY. Object 410, which is a textured object, shifts from original position 310 to a shifted position within shifted geometry 402a during a first pass. According to this approach, multisampling is used to sample shading at each pixel center 404. A multisample mask is used to select which subpixels will be sampled. In the case shown in FIG. 4A, a multisample mask bit (e.g., bit zero) enables sampling of subpixels 450 at each top left subpixel in quad 400 into an accumulation buffer. In each subsequent pass, as shown in FIGS. 4B, 4C and 4D, this technique shifts center point 312 and object 410 by −dX,+dY, +dX,+dY, and −dX,+dY, respectively, to situate geometry 402a to other shifted positions, such as shifted geometries 402b, 402c and 402d. Other multisample mask bits (e.g., bits 1, 2, and 3) facilitate discrete sampling of corresponding subpixels 452, 454 and 456 in respective passes 2, 3 and 4. After each successive pass, sampled pixels are generally accumulated in an accumulation buffer to form a final image.

There are several drawbacks to the jitter-based anti-aliasing technique described in FIGS. 2 to 4D. First, any shading sample position at each pixel center that is not covered by shifted geometry 402a through 402d can introduce artifacts at the edges of the shifted geometry. Encircled shading sample positions 420 depict uncovered shading sample positions likely to hinder the effectiveness of anti-aliasing by sampling shading for object 410 at locations that are outside the boundaries of shifted geometry 402a. Another drawback is that coverage sample positions 302 (i.e., identified by "X") do not coincide with shading sample positions 304. This hinders accurate interpolation between screen and texture coordinates and gives rise to some undesirable level of detail ("LOD") artifacts. Yet another drawback is that each time shifted geometry 402a is shifted to other positions, corresponding depth values usually vary or change at each shading sample position 304 during each shift. Depth values (or Z values) describe the relative distance between a nearest surface of a computer-generated object and a plane, such as a display screen or a view point. Reconciling these different depth values adds complexity to implementing this anti-aliasing approach, for example, during multipass rendering to composite lighting from a number of sources.

Multipass rendering is a well-known technique for forming final images by rendering some or all of the objects in the scene multiple times whereby one or more of those objects are modified during each pass. A desirable implementation of multipass rendering is to supersample both coverage and texture for each pixel of a particular object during a first multipass-rendering pass, and then to sequentially add or composite lighting effects from different lighting sources in subsequent multipass-rendering passes. The use of multisampling to incrementally add lighting during subsequent passes is desirable since multisampling consumes less computational resources than does a supersampling technique that samples both shading and coverage at each coverage sample position 302. But a drawback to using multisampling in conjunction with jitter-based supersampling is that different depth values are determined for a geometry being shifted over each, sample position during the jitter-based supersampling. As such, subsequent multisampling passes to apply lighting to that geometry requires computation-intensive interpolations to match the different depth values. Consequently, correcting mismatched depth values (or Z values) due to shifting object 410 generally offsets the benefits of using such an approach in graphics pipelines.

FIGS. 5A to 5D illustrate various arrangements of sample positions 502 that are positioned differently in each arrangement, which yields yet still another drawback. These coverage sample positions 502 are not moveable and these arrangements are usually hardware-specific. A user therefore requires specialized knowledge to determine sample positions 502 to use the conventional anti-aliasing technique described in FIGS. 2 to 4D, especially when implementing an accumulation buffer to oversample and/or to perform multipass rendering of an object within a scene. This is because a user generally must know the locations of those sample positions 502 when applying jitter-based supersampling to anti-alias an object.

FIGS. 6A and 6B demonstrate limitations of centroid multisampling, which has been recently developed to address some deficiencies associated with multisampling. In particular, centroid sampling adjusts the position for determining geometry color to be the center of all the covered sample positions of an entire pixel. For example, FIGS. 6A and 6B both show a shading sample position 614 for an unshifted geometry 602 (shown in dashed lines). But when the jitter-based anti-aliasing approach is active, then unshifted geometry 602 shifts to a position occupied by shifted geometry 604 of FIG. 6A for a first sample and by shifted geometry 606 of FIG. 6B for a second sample. A drawback to this approach is that the shifted geometry causes the centroid to change, thereby establishing unpredictable shading sample locations. For example, consider that the geometry shifts to a position occupied by shifted geometry 604 in FIG. 6A such that the geometry covers coverage sample position 612 but does not cover coverage sample position 616. Conventional centroid multisampling would then set a centroid sample 618 (shown as a solid square) to coincide with coverage sample position 612. So the net effect of shifting the geometry is FIG. 6A is −dX, +dY, as defined by the jitter-based anti-aliasing approach. But if the same geometry shifts to a position occupied by shifted geometry 606 in FIG. 6B so that both coverage sample positions 612 and 616 are covered, then centroid sample 618 (shown as a solid square) would be set between those coverage sample positions. Consequently, the shading sampling position would not shift by a predictable amount as does the geometry. That is, if the geometry shifts by +dX, +dY from shading sample position 614, then conventional centroid sampling causes the shading sample to reduce the actual amount of the shift by locating the shading sample at centroid sample 618. As shown in FIG. 6B, this results in an effective net shift of 0, +dY for the geometry (i.e., the geometry shifts by +dX and centroid multisampling resets the centroid sample back by −dX to between converge sample positions 612 and 616). So with the effective net shift of the geometries being made unpredictable, a jitter-based anti-aliasing approach implementing conventional centroid multisampling will be subject to significant reductions in quality improvement.

In view of the foregoing, it would be desirable to provide a system, an apparatus and a method for minimizing the drawbacks of the above-described conventional anti-aliasing techniques.

SUMMARY OF THE INVENTION

A system, apparatus, and method are disclosed for modifying positions of sample locations for selectably oversampling pixels to anti-alias non-geometric portions of computer-generated images, such as texture. Anti-aliasing is effectuated, at least in part, by shifting shading sample positions relative to a frame of reference that includes the geometries of the computer-generated images and coverage sample positions such that there is no relative motion between the geometries and one of the coverage sample position. In one embodiment, an apparatus anti-aliases a computer-generated object in a graphics pipeline that is configured to execute instructions of an applications program to generate geometry data representing geometries. The exemplary apparatus includes a pipeline front end unit configured to at least determine coverage of the geometries over coverage sample positions and a subpixel shifter configured to shift shading sample positions relative to a frame of reference. This frame of reference includes the geometries and the coverage sample positions such that there is no relative motion or movement between the geometries and the coverage sample positions when shifting shading sample positions. The apparatus can include a bus coupled to the subpixel shifter for providing subpixel shifting masks to select subsets of shading sample positions of the shading sample positions. The bus, in some cases, couples to the subpixel shifter at a mask input, which is designed to receive subpixel shifting masks for selecting which subsets of shading sample positions of the shading sample positions will be shifted. Further, the apparatus can include a texture unit configured to determine shading at each of the subsets of shading sample positions. The subpixel shifter is configured to shift each of the shading sample positions to a respective coverage sample position in a pixel. Among other things, this facilitates anti-aliasing non-geometric portions of the computer-generated object.

In at least one embodiment, the subpixel shifter aligns the shading sample positions with the coverage samples to produce symmetrical arrangements of the shading sample positions over groupings of pixels, thereby reducing mismatched values of level of detail ("LOD") that otherwise would introduce LOD artifacts. In at least another embodiment, the texture unit is further configured to determine shading at the coverage sample positions rather than at default sample positions to facilitate accurate interpolation between screen coordinates and texture coordinates. This ensures consistency of values of LOD over adjacent groupings of pixels of the computer-generate object.

In a specific embodiment, the subpixel shifter further comprises a subpixel centroid sampling unit configured to establish centroids at only coverage sample positions. In some cases, the centroid sampling unit is configured to shift the shading sample positions to locations of the coverage sample positions without the applications program specifying either the locations or subpixel shift amounts. This obviates manual determination of either the locations or the subpixel shift amounts, or both. The subpixel shifter is configured to perform multisampling when in a first state and to perform oversampling of at least a portion of the computer-generate object using the subpixel shifter when in a second state. This enables effective use of both multisampling and oversampling during multi-pass rendering. In certain cases, the subpixel shifter is selectably operable to either configure the subpixel shifter to perform multisampling or to anti-alias the non-geometric portions of the computer-generated object. The subpixel shifter can be configured to shift any number of subsets of the shading sample positions to effectuate any degree of anti-aliasing. Also, the subpixel shifter can be configured to maintain substantially constant depth values of the geometries at each of the shading sample positions. This dispenses with a requirement to reconcile varying depth values that arise when shifting the geometries.

In another specific embodiment, one or more anti-aliasing mode instructions include an instruction to execute centroid sampling to enable the subpixel shifter to selectably shift each of the subsets of shading sample positions for translation relative to the frame of reference, wherein each of the subsets of shading sample positions are shifted in series as the applications program submits a scene into the graphics pipeline a number times equivalent to the number of the subsets being shifted. In other embodiments, the apparatus includes a subpixel shifting mask selector unit coupled to the bus to provide each of the subpixel shifting masks, and an anti-aliasing mode selector unit configured to enable the subpixel shifter to perform oversampling. The anti-aliasing mode selector unit can be coupled to the pipeline front end unit to initiate generation of multiple copies of the geometries from a single scene and to provide the multiple copies in parallel to the subpixel shifter to shift each of the subset of shading sample positions in approximate synchronicity. In some cases, the apparatus can further include a duplicator unit coupled to the subpixel shifter to locally generate multiple copies of the geometries from a single scene and to provide the multiple duplicates to the subpixel shifter to shift each of the subset of shading sample positions.

In another embodiment, a method for selectably performing multisampling and oversampling to sample shading for geometries of a computer-generated object is disclosed. The method includes multisampling a first portion of a scene to determine one shading value per pixel, and oversampling a second portion of the scene by shifting shading sample positions relative to a frame of reference that includes the geometries and coverage sample positions such that there is no relative translation between the geometries and the coverage sample positions. The shading sample positions are shifted to provide multiple shading values per pixel. The shading sample positions are shifted to establish translated shading sample positions coinciding with the coverage sample positions. This reduces aliasing of non-geometric portions of the computer-generated object. In an embodiment, multisampling the first portion includes determining shading for a background object composed of a substantially low number of tessellated geometries associated with a coarse level of detail ("LOD"). Oversampling the second portion can include determining shading for a foreground object composed of a substantially high number of tessellated geometries associated with a fine LOD. Oversampling reduces texture aliasing between the coarse LOD and the fine LOD.

In yet another embodiment, a general purpose graphics processing unit ("GPGPU") includes a geometry processor configured to generate a geometry in accordance with application program instructions. The GPGPU includes also includes a rasterizer configured to convert the geometry into data representing coverage of subpixels at coverage sample positions and a shader to determine shading for subpixels. The shader includes a subpixel centroid sampling unit configured to perform centroid multisampling. The subpixel centroid sampling unit can be configured to receive a number of subpixel shifting masks to either establish a subpixel centroid that coincides with a coverage sample position or reposition a default centroid from a pixel center to the coverage sample position. The GPGPU can also include a texture unit configured to determine shading for the geometry using the coverage sample positions and a raster operations ("ROP") unit configured to at least perform alpha-testing against the shading for the geometry. In at least one embodiment, the GPGPU includes a coverage sample determinator to determine a number of covered sample positions that are covered by the geometry and a number of uncovered sample positions that are not covered by the geometry. Both covered sample positions and uncovered sample positions share a frame of reference with the geometry such that there is no relative shifting among the geometry, the covered sample positions and the uncovered sample positions when anti-aliasing the computer-generated images. The GPGPU further includes a shading sample selector configured to select either a covered sample position from the number of covered sample positions or an uncovered sample position from the number of uncovered sample positions. Also included is a shading sample translator configured to establish the subpixel centroid, if the covered sample position is selected. Or, shading sample translator repositions the default centroid if the uncovered sample position is selected. Note that the subpixel centroid and the default centroid can form symmetrically-spaced texture sample positions over a number of pixels to reduce level of detail ("LOD") artifacts.

BRIEF DESCRIPTION OF THE FIGURES

The invention is more fully appreciated in connection with the following detailed description taken in conjunction with the accompanying drawings, in which:

FIG. 3 shows a quad of four pixels implementing a conventional jitter-based anti-aliasing technique;

FIGS. 4A to 4D illustrate shifted geometries as triangles being shifted about a center point of a quad;

Like reference numerals refer to corresponding parts throughout the several views of the drawings.

DETAILED DESCRIPTION OF EXEMPLARY EMBODIMENTS

Figure 1:
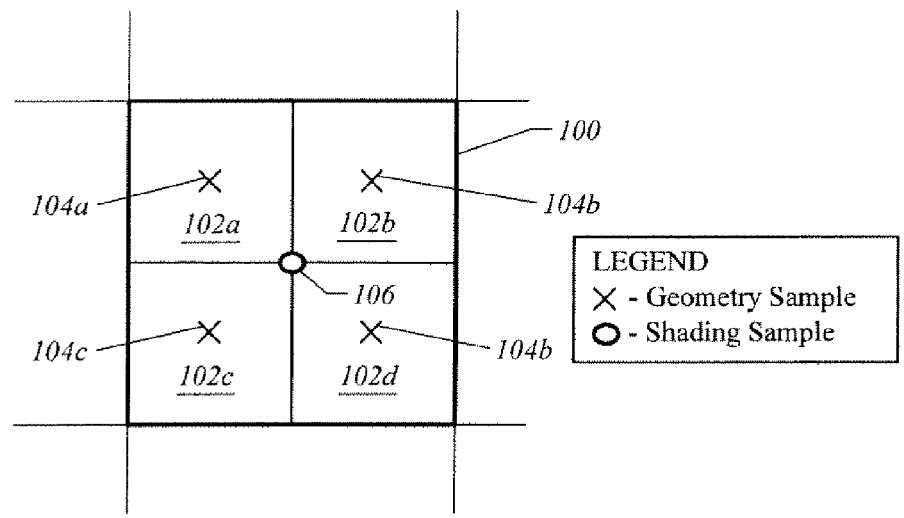
FIG. 1 shows sampling of a pixel in accordance with multisampling as another conventional anti-aliasing technique.
Figure 2:
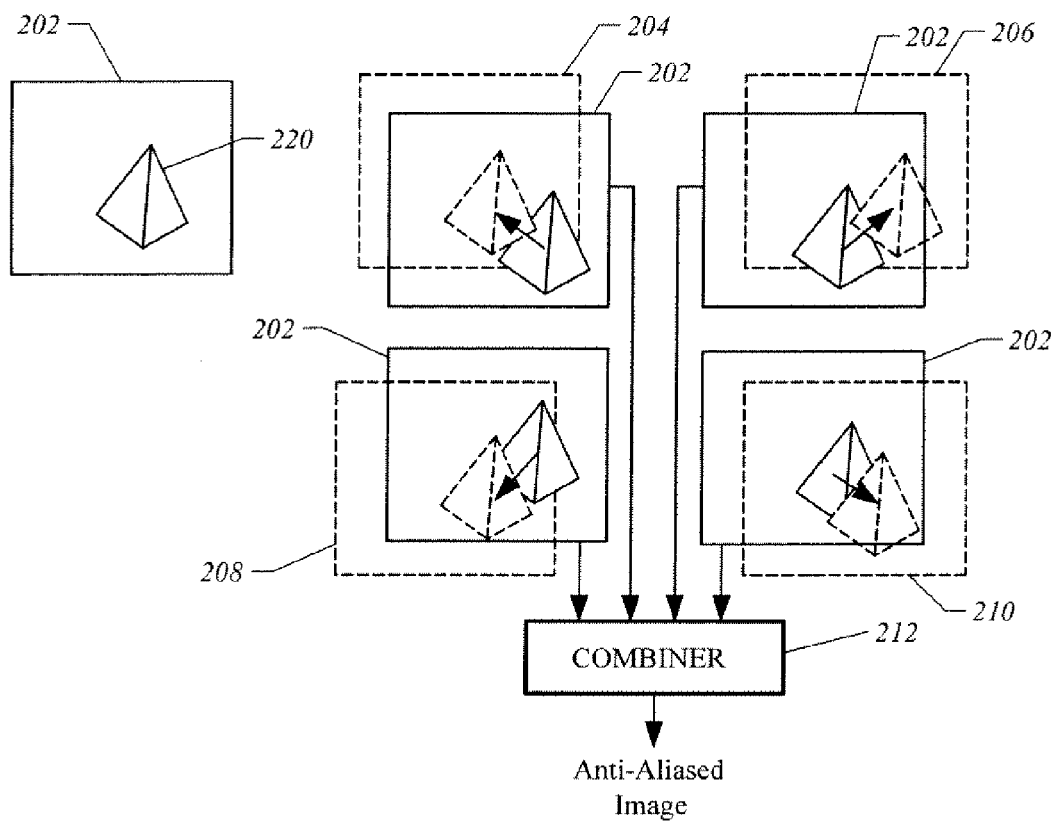
FIG. 2 illustrates a conventional jitter-based anti-aliasing technique that repeatedly shifts each geometry and pixel of either a scene or an object in the scene.
Figure 5A:
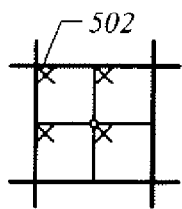
FIGS. 5A to 5D illustrate various arrangements of sample positions that are positioned differently in each arrangement.
Figure 5B:
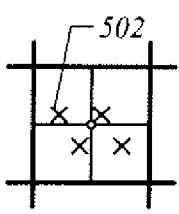
Figure 5C:
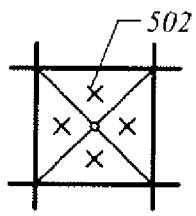
Figure 5D:
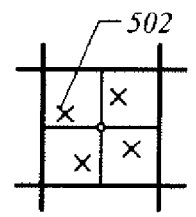
Figure 6A:
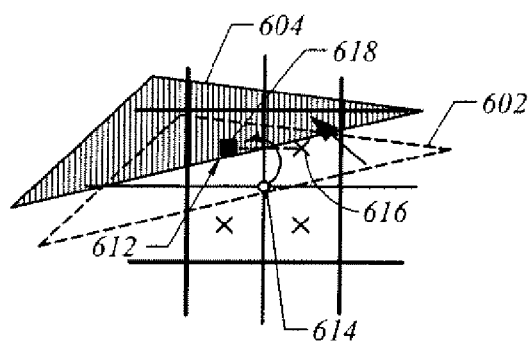
FIGS. 6A and 6B demonstrate limitations of centroid multisampling if implemented in oversampling texture with jitter-based anti-aliasing.
Figure 6B:
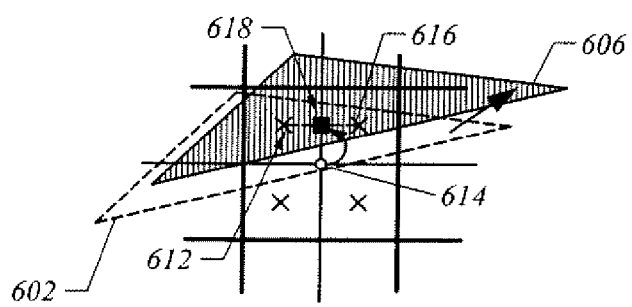
Figure 7:
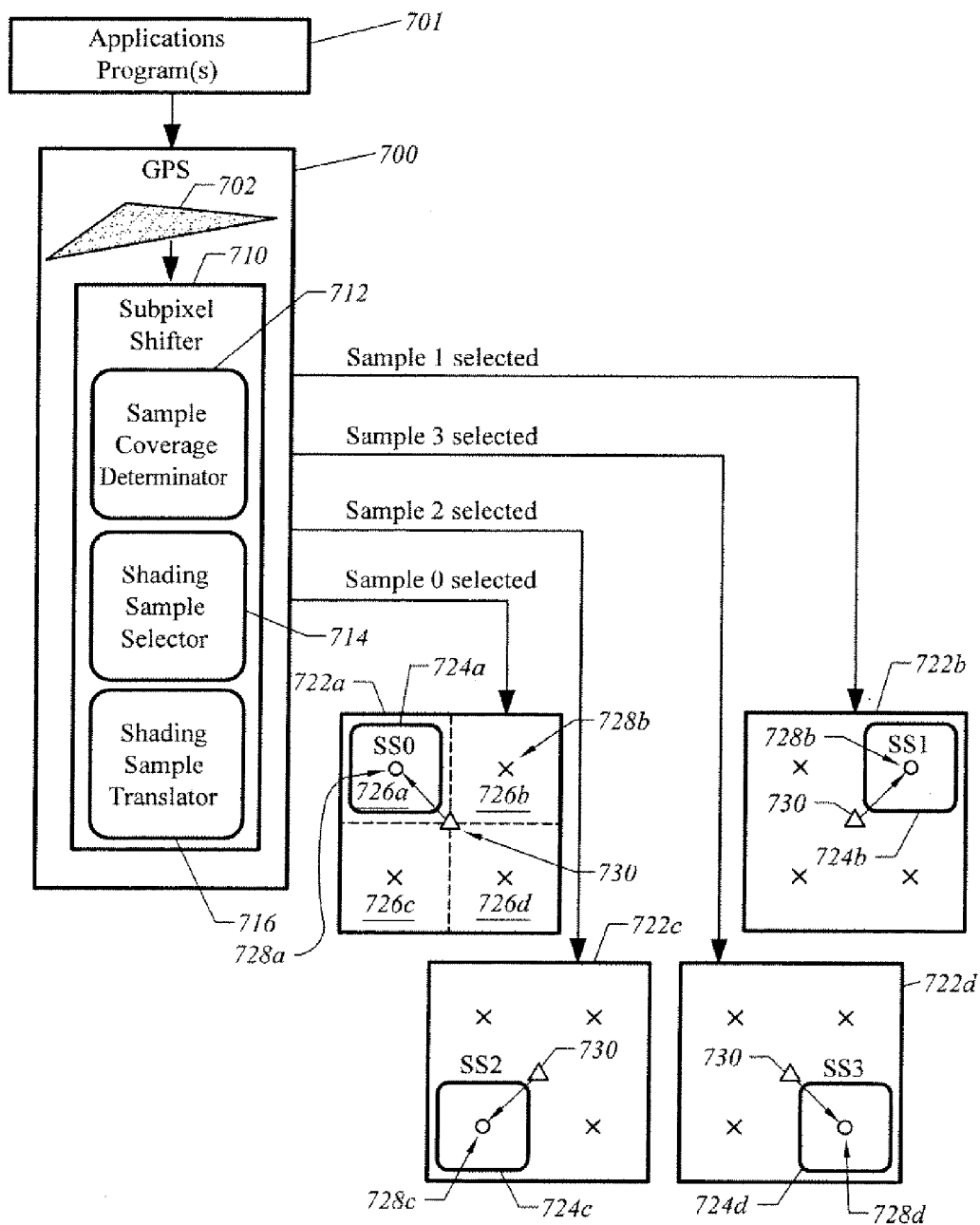
FIG. 7 is a block diagram illustrating a graphics processor system that includes a subpixel shifter for translating shading sample positions to anti-alias computer-generated images in accordance with a specific embodiment of the present invention.

FIG. 7 is a block diagram illustrating a graphics processor system 700 that includes a subpixel shifter 710 to anti-alias computer-generated images in accordance with a specific embodiment of the present invention. In various embodiments, subpixel shifter 710 translates shading sample positions relative to a computer-generated object ("object") that is to be rendered as part of frame. In particular, subpixel shifter 710 generates multiple sample positions (i.e., multiple anti-aliasing sample points) at which to sample shading for a pixel to determine anti-aliased texture for a geometry (i.e., a geometric primitive). In accordance with various embodiments, subpixel shifting as used herein, refers generally to shifting a sampling position by less than a size of a pixel rather than shifting an object or a geometry thereof. In some cases, subpixel shifting refers to shifting shading sample positions relative to a frame of reference including both coverage sample positions and the geometry. A frame of reference can be a coordinate system with which to measure position or movement relative to two or more systems.

Advantageously, the subpixel shifting eliminates spatial shifting of geometries with respect to sample positions. Subpixel shifter 710 therefore maintains relatively constant depth values associated with each of the shading sample positions, thereby dispensing with a requirement to reconcile varying depth values (e.g., by determining a value representative of the actual depth of a geometry) that typically arise when shifting geometries of an object rather than translating the sample positions. This can free up computational resources when implementing post-shader rasterization operations, such as alpha-testing and the like, especially during multipass rendering operations. Further, subpixel shifter 710 advantageously translates shading sample positions to coincide with coverage sample positions, which facilitates accurate interpolation between screen coordinates and texture coordinates. This enables non-geometric portions (e.g., edges for texture) of computer-generated images to more closely align with geometric edges (e.g., of geometries) to reduce undesirable level of detail ("LOD") artifacts, among other things.

In at least one embodiment, subpixel shifter 710 modifies multisampling of pixels to generate multiple sample positions at which to sample shading for each pixel of an object rather than conventionally supersampling both shading and coverage for each subpixel in an entire frame containing the object. This reduces computational overhead associated with, for example, conventional supersampling. By limiting the generation of multiple sample positions to anti-alias only the object (i.e., effectively oversampling only the object), the computational overhead of implementing multipass rendering can be reduced when integrating diffuse, specular, reflection, ambient, shadow and other like computer-generated effects. As used herein, oversampling refers in some embodiments to supersampling pixels of only a computer-generated object or supersampling less than every pixel of a screen. In particular, subpixel shifter 710 can oversample an object initially at the subpixel level, but then can implement multisampling during subsequent passes of a multipass rendering process to render different attributes onto or into the object and/or scene. By using multisampling rather than conventional supersampling during multipass rendering, desirable frame rates can be achieved especially during fill-rate limited situations where many pixels are being drawn to a screen. In another embodiment, subpixel shifter 710 translates shading sample positions to predefined locations at which coverage samples are positioned in a manner that is transparent to a user. As such, a user can formulate a set of executable instructions for an applications program without having to specify the locations of the shading sample positions (or the amount of shifting) as an argument of a program instruction, for example. Different manufacturers of components for graphics processing system 700 typically predefine the coverage sample locations in accordance with their each manufacturer's unique implementation. Advantageously, a user need not be required to either know or manually determine the locations of the coverage sample positions that are necessary to anti-alias an object when using the various embodiments of subpixel shifting. As such, a user can formulate a set of executable instructions for an applications program without having to specify locations, such as in terms of dX and dY from a pixel center.

Subpixel shifter 710 of FIG. 7 includes a sample coverage determinator 712, shading sample selector 714 and shading sample translator 716. As is described in more detail below, sample coverage determinator 712 determines whether a portion of a geometry 702 covers a particular coverage sample position, and consequently, an associated subpixel. Pixels that include coverage samples are depicted as pixels 722a to 722d ("pixels 722"). Note that each pixel in pixels 722 can represent any single pixel with different subpixels being selected for sampling in that single pixel. Each of the subpixels are either covered or uncovered. Shading sample selector 714 selects the position in each pixel 722a to 722d for sampling shading. In particular, shading sample selector 714 selects a specific coverage sample position as the location at which to sample shading in one of pixels 722. Further, shading sample translator 716 translates the shading sample position for the subpixels for pixels 722. In a specific embodiment, shading sample translator 716 moves shading sample positions 730 in pixels 722 from the center of each pixel to respective coverage sample positions 726a-726d. Translating shading sample positions to coincide with coverage positions improves accuracy of interpolating between screen (or viewport) coordinates and texture coordinates. This helps reduce undesirable level of detail ("LOD") artifacts associated with shading sample positions being displaced from coverage sample positions.

In operation, one or more applications programs 701 include executable instructions, such as vertex program instructions or fragment program instructions, that when executed by a processor (not shown) generate geometry data (i.e., data describing elements of a computer-generated image to be rendered). The geometry data typically includes vertex coordinates and shading information for one or more geometries 702 that are used to render a collection of pixels as an object. Geometries 702 are generally referred to as geometric primitives and can take a variety of shapes, such as triangles or any other suitable type of polygon. Graphics processing system 700 also transforms the geometry data into pixel data by segmenting the frame into subpixels, such as subpixels 726a to 726d ("subpixels 726"), which are smaller and more numerous than the actual number of pixels 722. As an example, consider that graphics processing system 700 divides each pixel in a frame (i.e., a full screen or display of pixels) into four subpixels. As shown in FIG. 7, pixel 722a is divided into subpixels 726a to 726d, with subpixel boundaries being represented as dashed lines. In some embodiments, subpixels can be referred to as fragments, each corresponding to a pixel and includes color, depth, and/or texture-coordinate values.

Sample coverage determinator 712 includes a number of sets of coverage sample positions at which any portion of geometry 702 is sampled to determine whether it covers one or more of the coverage sample positions 728a to 728d ("coverage sample positions 728"). These coverage sample positions are typically fixed and are spatially arranged within a grid associated with a pixel to determine geometry coverage coinciding with respective subpixels. For example, subpixels 726a to 726d include coverage sample positions 728a to 728d each of which are positioned at the center of each subpixel. In at least one embodiment of the present invention, locations of coverage sample positions and original shading sample positions are specified by implementing multisampling with the attendant coverage and shading sample positions as set forth in multisampling software or hardware modules, or both. Specialized knowledge, however, is generally required to determine the exact positions of coverage sample positions 728a to 728d when using conventional sampling techniques as they are not generally easily discovered. Knowledge of such positions by a user is not required when implementing various embodiments of the present invention. In some embodiments, coverage and shading sample positions can also be referred to as subsamples. After sample coverage determinator 712 determines the coverage sample positions that geometry 702 covers, it generates coverage information specifying whether a coverage sample position is covered.

Shading sample selector 714 is configured to receive the coverage information and to select which subpixel in a pixel from which shading will be sampled. Shading sample selector 714 first selects which coverage sample position is to be sampled. For example, shading sample selector 714 can individually select coverage sample position zero ("SS0") 728a in selected subpixel 724a or any other coverage sample position, such as coverage sample position one ("SS1") 728b in selected subpixel 724b, coverage sample position two ("SS2") 728c in selected subpixel 724c or coverage sample position three ("SS3") 728d in selected subpixel 724d. Then, shading sample translator 716 translates or repositions respective shading sample positions 730 in any of selected subpixels 724a to 724d to a corresponding selected coverage sample position 728a to 728d. It is these selected coverage sample positions that will provide a location at which to sample shading and/or texture. Note that the functionalities of sample coverage determinator 712, a shading sample selector 714 and a shading sample translator 716 need not necessarily be performed in the order described above. An example of an alternative flow for practicing a specific embodiment of the present invention is described next.

Figure 8:
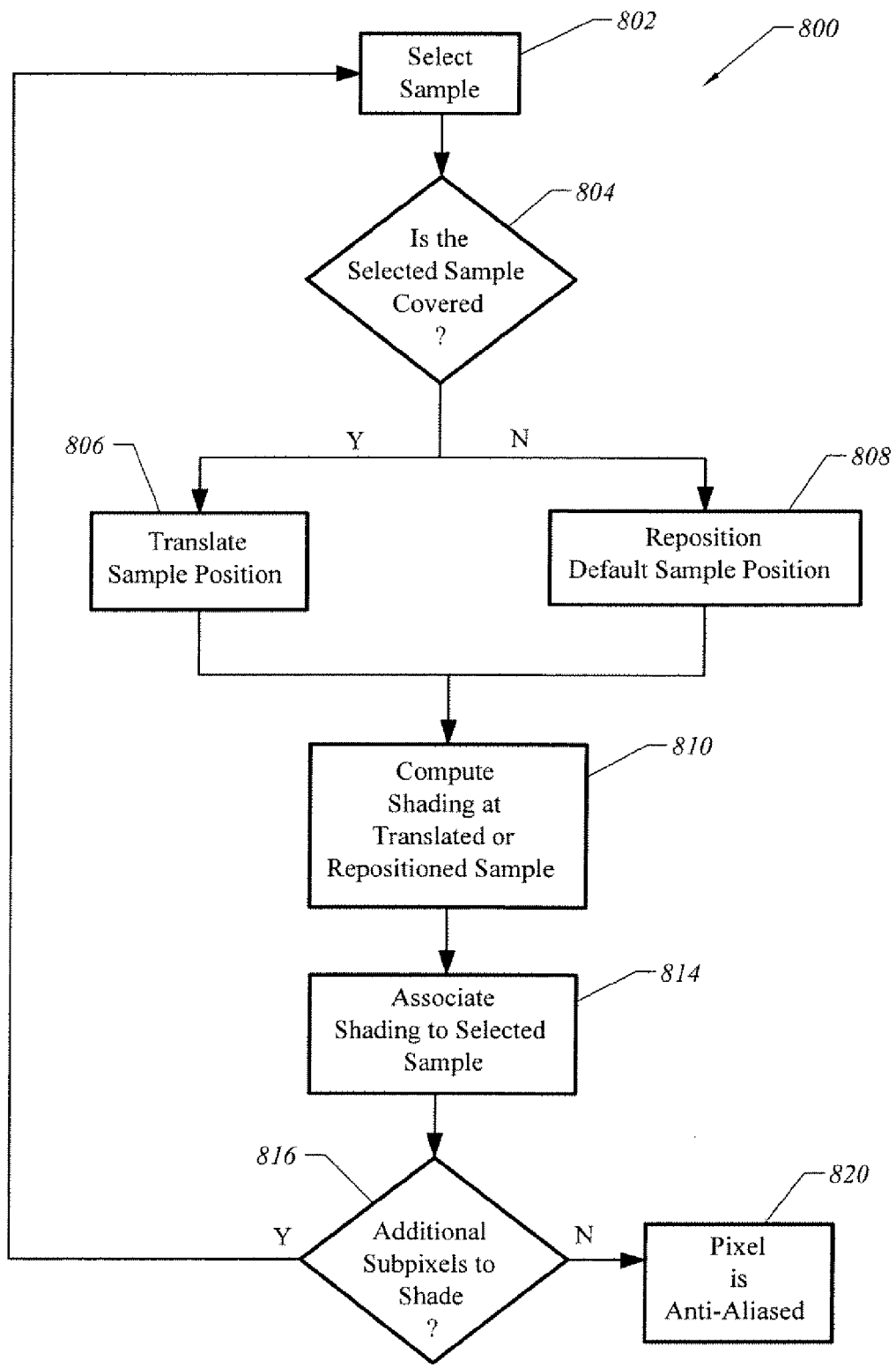
FIG. 8 is a flow diagram illustrating an exemplary method of anti-aliasing a computer-generated object, according to another embodiment of the present invention.

FIG. 8 is a flow diagram illustrating an exemplary method of anti-aliasing a computer-generated object, according to another embodiment of the present invention. Flow 800 provides for anti-aliasing of texture and the like. At 802, a sample is selected, individually or with others, to determine an associated texture value for a subpixel. Next, at 804, a decision is made as to whether the selected sample is covered by a geometric primitive of an object being anti-aliased. If it is covered, flow 800 translates a sample position at 806. By translating a sample position about a point on an object, flow 800 mimics or simulates shifting a geometry with reference to stationary shading sample positions, thereby effectuating subpixel shifting in accordance with various embodiments of the present invention. If the selected sample is not covered, then a default sample position is determined and then repositioned at 808 to be near or to coincide with a coverage sample position. In some embodiments, a shading sample position can originally be located at the center of pixel if multisampling is used prior to repositioning at 808, where multisampling sets a default shading position at the center of a pixel if all or none of the sample positions (i.e., coverage sample positions) are covered. Then, flow 800 computes shading of a translated sample or a repositioned sample at 810, with the shading or color being associated to a corresponding subpixel at 814. Next, a decision at 816 determines whether to continue to repeat flow 800. So long as there are additional subpixels to shade (for a pixel, a quad of pixels, an object or a frame), flow 800 continues. But once the pixels of an object are supersampled, then the texture that will eventually be mapped thereto will be anti-aliased for one or more pixels at 820.

Figure 9:
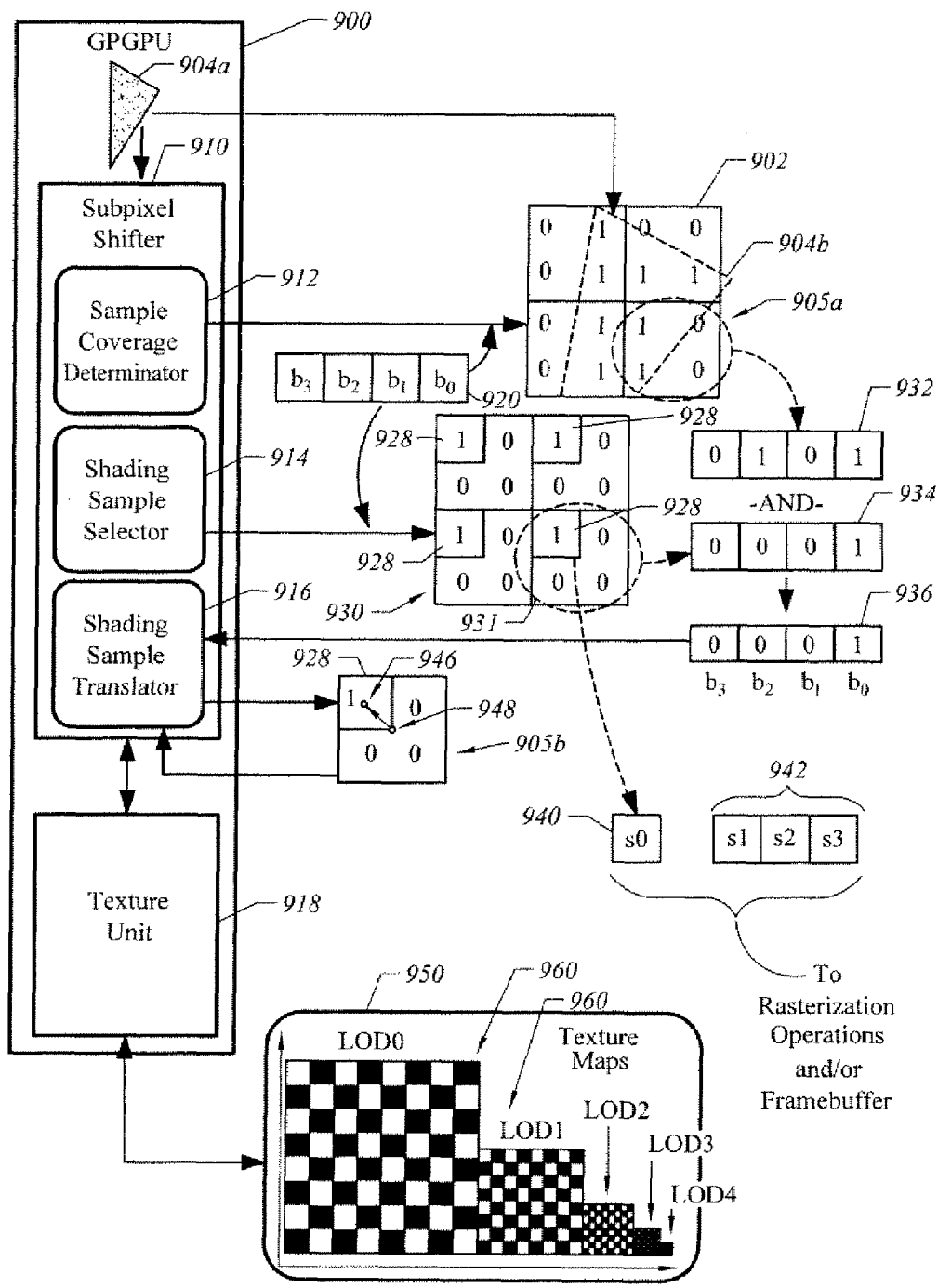
FIG. 9 is a functional block diagram depicting the functionality of a subpixel shifter, according to an embodiment of the present invention.

FIG. 9 is a functional block diagram depicting the functionality of a subpixel shifter, according to an embodiment of the present invention. As shown, a graphics processing system is implemented as a general purpose graphics processing unit ("GPGPU") 900 and includes subpixel shifter 910 and a texture unit 918, which applies texture and/or shading to geometries, such as geometry 904a. In this example, sample coverage determinator 912 functions to determine subpixel coverage over four pixels constituting a quad 902, which therefore contains sixteen sample positions as shown as either numbers zero or one. As shown, each coverage sample position that geometry 904b covers is associated with "1" to signify coverage, whereas any coverage sample position that is not covered is identified by a "0." Shading sample selector 914 then selects a subset of sample positions corresponding to mask bits 928, which represent a subset of mask bits 930 for quad 902. Note that in this instance, coverage information and subpixel shifting information each include four bits 920, which include bit three ("b3") to bit zero ("b0"). Bits 0, 1, 2 and 3 correspond to the top left sample position, the top right sample position, the bottom left sample position and the bottom right sample position, respectively. For illustration purposes, FIG. 9 shows only coverage information for pixel 905a as a grouping of bits 932, which can be referred to as a coverage mask in some embodiments. This figure also shows mask bits 931 as a grouping of bits 934, which can be referred to as a subpixel shift mask in some embodiments. Although not shown, other pixels in quad 902 can be processed in a similar manner. Shading sample selector 914 continues by performing a logical AND operation on groupings of bits 932 and 934 to yield result bits 936, whereby bit zero is set to 1. After determining result bits 936, shading sample selector 914 can at least pass those bits and mask bits 934 to shading sample translator 916 for translating a shading sample position as described next.

Shading sample translator 916 determines from results bits 936 that subpixel 928 of pixel 905*b* is to include a translated sample position. As such, number "1" at bit zero 936 indicates that subpixel 928 of pixel 905*b* is covered, and therefore, translates the shading sample position from 948 to 946, thereby effectuating subpixel shifting of sample positions by an amount less than a pixel size. The distance between a pixel center to a coverage sample position can define the distance over which a shading sample position is shifted. So rather than shifting geometry 904*b* relative to the coverage sample point, subpixel shifter 910 shifts the shading sample position 948 of pixel 905*b* relative to stationary geometry 904*b*, according to various embodiments of the present invention. As mentioned earlier, this advantageously preserves the depth locations and/or values for geometry 904*b* during the process of subpixel shifting. Note that pixel 905*b* is pixel 904*a*, but after shading sample translator 916 establishes a translated shading position 946.

Next, GPGPU 900 can sample translated shading position 946 and apply the appropriate shading to the geometry. Texture unit 918 is used to, among other things, map texture to the associated subpixel by interpolating between screen and/or depth coordinates and texture coordinates. The shading can be derived from texture maps 950 (or mipmaps), texture atlases, formulaically generated texture (i.e., texture generated according to an equation) or other like sources of texture and/or shading. A texture map is made up of a number of elements ("texels"), each of which has a single color value. Texture unit 918 determines a texture value (i.e., a shading value) for a subpixel by selecting one or more appropriate texels from a texture map. In this example, texture maps 950 include a number of mipmaps 960 each having a different level of detail ("LOD"). For example, the first mipmap labeled LOD0 can be a base texture map for 512×512 pixels, with each subsequently numbered mipmap being coarser than the preceding mipmap. Texture maps 950 usually end with an LOD as a 1 pixel×1 pixel dot. Note that shading can be sampled on a subpixel-by-subpixel basis, a pixel-by-pixel basis, a quad-by-quad basis or by groupings of any number of pixels. In one embodiment, texture unit 918 samples each of the translated sampling positions in quad 902 to determine an appropriate LOD and mipmap to apply to the associated subpixels, such as subpixel ("s0") 940 and subpixels ("s1, s2, and s3") 942. Thereafter, the shaded subpixels can be stored in a buffer for further processing or later display. Or, the shaded subpixels can be processed by, for example, an ROP ("Rasterizing OPeration") unit to perform alpha-testing or the like.

In various embodiments of the present invention, shading sample translator 916 is configured to execute application instructions to effectuate translation of shading sample positions. Table I below depicts a snippet of pseudo-code that causes shading sample translator 916 to perform translation of shading sample positions by implementing one or more centroid sampling instructions, such as those set forth in nVidia's® "Cg" Language, High Level Shading Language ("HLSL") in DirectX 9.0® and OpenGL's OpenGL Shading Language ("GLSL").

TABLE I

| | |
|---|---|
| centroidCoverage = rasterCoverage AND subpixelshiftMask | //*set variable "centroid-Coverage" to one or more result bits from performing logical AND *// |
| shadePosition = (centroidEnabled)? | //* determine whether to translate sample position *// |
| centroidOf(centroidCoverage) | //* set shading sample position to centroid sampling position *// |

Table I shows that the one subpixel shift mask bit that set to 1 in subpixelshiftMask selects a corresponding coverage sample position that is covered, as defined by rasterCoverage (e.g., a corresponding bit set to 1). Then, the centroidOf function determines a centroid for a unitary coverage sample position. In some embodiments, rasterCoverage is a coverage mask. Normally, a conventional centroid instruction computes a centroid as being the center of all the coverage sampling points that are covered by a geometry of interest. This ensures that a shading sample position for an entire pixel will always lie within the geometry being rendered. Among other things, the conventional centroid determination function is over an entire pixel, and thus is not well suited for practicing the present invention. But in accordance with various embodiments of the present invention, the centroid function is modified to determine a centroid of only one subpixel, thereby "snapping" or translating the centroid sampling point to coincide with the single coverage sample identified by a subpixel shift mask bit that is set to 1. The implementation of subpixelshiftMask, among other things, leverages the functionality of one or more executed centroid sampling instructions to effectuate subpixel shifting in accordance with embodiments of the present invention.

Note that the example shown in FIG. 9 illustrates translation of a shading sample position when a specific coverage sample is covered. But when a coverage sample position is not covered, and it is selected, then shading sample translator 916 is configured to reposition a shading sample position to the coverage sample position. Conventionally, a default centroid is set to coincide with the center of the pixel to provide a default shading sample position, as determined by the specific multisampling implementation when a geometry covers each coverage sample position of the pixel. Similarly, if none of the coverage sample positions are covered, the default centroid is set at the pixel center. By setting the pixel center as a default shading sample position, shading sampled from that position is applied to the entire pixel. The setting of the default centroid, however, can produce mismatched LODs from quad to quad, as will be discussed below in FIG. 13. In accordance with at least one embodiment of the present invention, a centroid function is modified to translate a centroid (i.e., a centroid sampling point) to coincide with the single coverage sample identified by a subpixel shift mask bit that is set to 1, even when the corresponding subpixel is not covered by the geometry. By setting the default centroid to a position at which an uncovered coverage sample resides, improved accuracy in interpolating between screen coordinates and texture coordinates can more closely align non-geometric edges (e.g., of textures) with geometric edges (e.g., of geometries) to reduce undesirable level of detail ("LOD") artifacts.

Table II below depicts a snippet of pseudo-code instructing shading sample translator 916 to perform translation of shading sample positions using a modified centroid sampling instruction, whereby a default centroid is repositioned to coincide with an uncovered, but selected coverage sample position.

TABLE II

| | |
|---|---|
| centroidCoverage = rasterCoverage AND subpixelshiftMask | //* set variable "centroid-Coverage" to one or more result bits from performing logical AND *// |
| if (centroidCoverage == 0) | //* do following if sample position is not covered *// |
| centroidCoverage = subpixelshiftMask | //* select sample position that corresponds to "1" in subpixel shift mask*// |
| shadePosition = (centroidEnabled)? centroidOf(centroidCoverage) | //* determine whether to translate sample position *// //* reposition centroid sampling position to/near a coverage sample position *// |

Table II shows that the subpixelshiftMask influences the determination of a centroid in the above examples. Specifically, if a bit in a subpixel shift mask bit is set to 1 for selecting a specific subpixel, and if a corresponding bit in rasterCoverage is set to 0 (i.e., the subpixel is not covered), then the shading sample position that is usually established as the default centroid will be repositioned to the selected coverage sample position. By equating the variable centroidCoverage to the one or more bits of subpixelshiftMask, the subsequent centroidOf function is effectively performed on the mask bits rather than coverage mask bits unlike normal centroid determinations. Examples of how a shading sample point translates to a coverage sample point, regardless whether a subpixel is covered or not covered, are shown described next.

FIGS. 10A to 10D illustrate subpixel shifting in accordance with one embodiment of the present invention. Four shading sample positions are established in different areas in the pixels of a quad. FIGS. 10A, 10B, 10C and 10D respectively depict shading sample positions being established in the top left, top right, bottom left and bottom right quadrants in each pixel of a quad. In this example, coverage mask information in column 1004 and subpixel shift mask bits in column 1006 are used to determine translated sample positions in column 1002. Results of sampled shading ("sampling results") in column 1008 include translated shading sample positions arranged to form an arrangement that reduces undesirable level of detail ("LOD") artifacts, among other things.

Figures 10A, 10B, 10C, 10D:
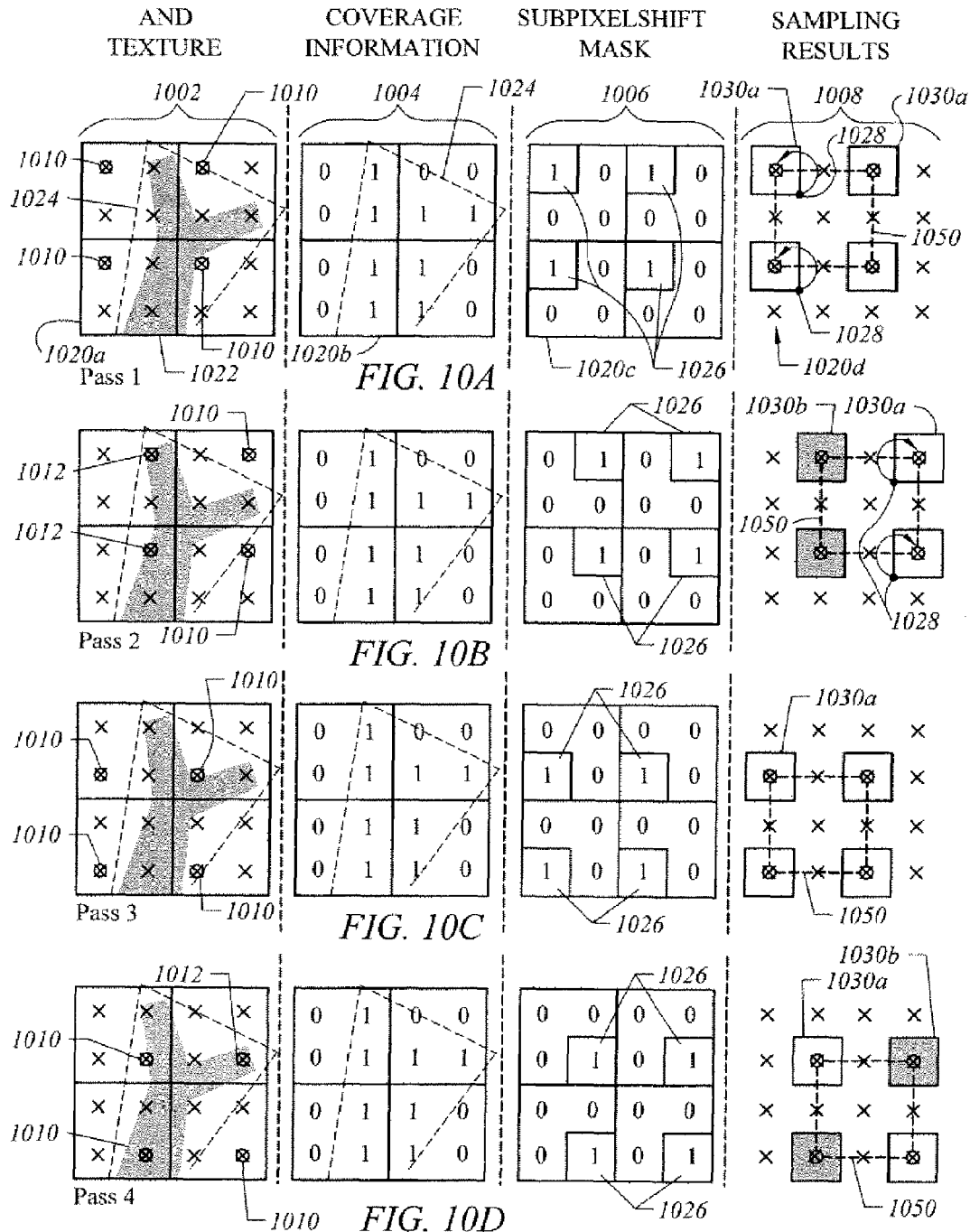
FIGS. 10A to 10D illustrate subpixel shifting in accordance with one embodiment of the present invention.

In FIG. 10A, coverage mask information in column 1004 includes coverage bits set to 1 for those that are covered by geometry 1024 and are reset to 0 for those that are not covered. Subpixel shift mask in column 1006 of FIG. 10A includes subpixel shift mask bits 1026 of quad 1020c to select shading sample positions for shifting. Translated sample positions are shown in quad 1020a of column 1002 as sample positions 1010 in the top left corner of each pixel. Texture 1022 that is to be mapped onto geometry 1024, is shown in this example as a black "twig." Sampling results in column 1008 show the results of sampling shading at each of sample positions 1010 in FIG. 10A. Shading for subpixels 1030a are shown to be the shading sampled at 1010 (e.g., white in this example). Note that sample positions 1010 form an arrangement having a symmetrically-shaped arrangement 1050 for reducing LOD artifacts. While symmetrically-shaped arrangements 1050 are shown to be square-like in shape, any other polygonal shape (e.g., due to differently positioned coverage sample positions) is also suitable to so long as the polygonal shape remains the same over a number of quads.

Also note that default shading sampling position 1028 is translated to sample positions 1010 to form arrangement 1050. In FIG. 10A, quads 1020a to 1020d represent the same quad in the examples shown, but each depict unique characteristics for determining shading and reducing LOD artifacts. Further, FIGS. 10B to 10D illustrate similar characteristics but for different sets of subpixel shift mask bits 1026, each set selecting corresponding shading sample positions for translation to positions 1010. Note that in FIG. 10B, subpixels 1030b include shading (i.e., black coloring) from corresponding translated sample positions 1012, each of which causes shading to be derived from texture 1022. Similar to subpixels described above in FIG. 10A, subpixels 1030a of FIG. 10B include shading from sample positions 1010 that do not sample shading from texture 1022.

Figure 11:
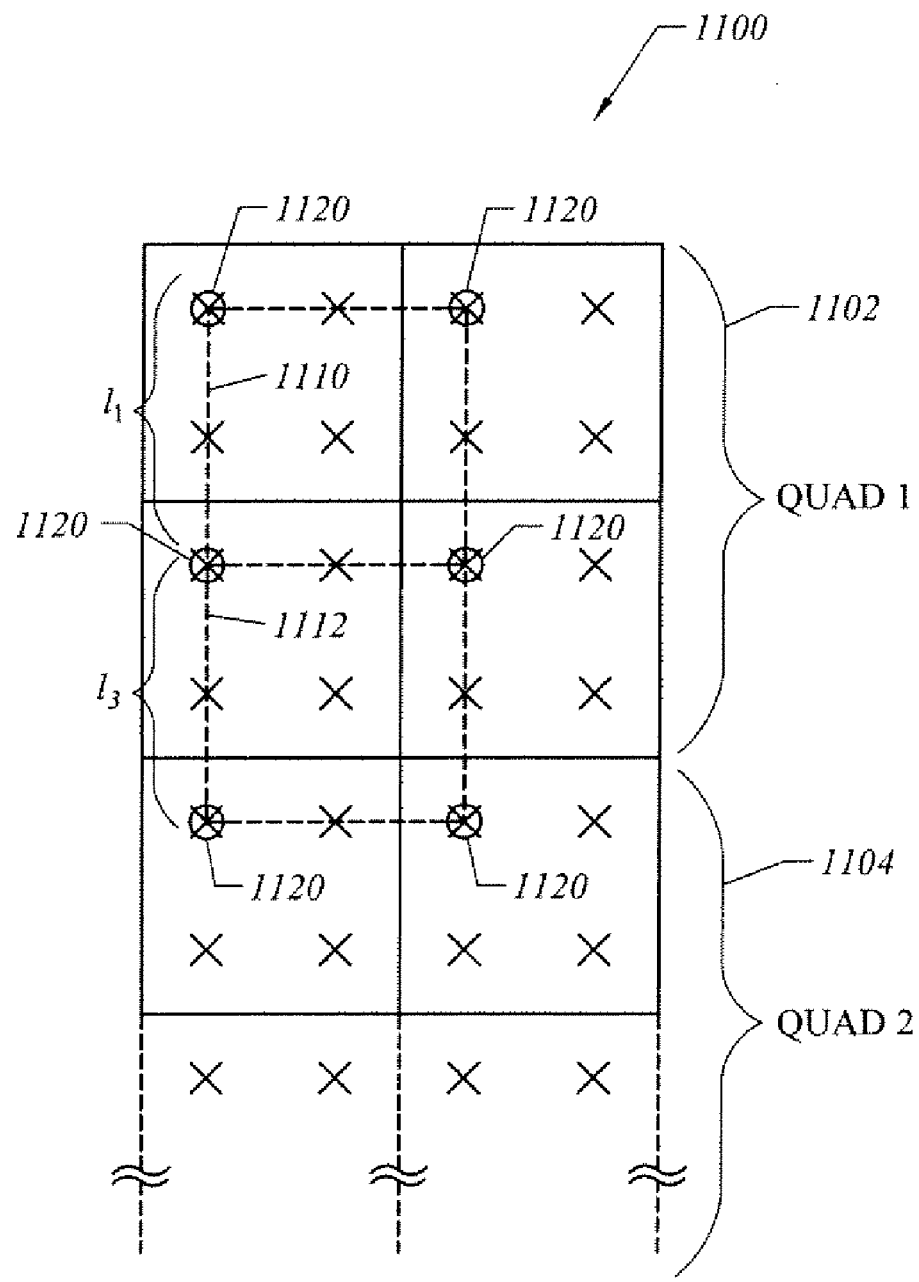
FIG. 11 illustrates arrangements of translated shading samples to reduce the level of detail artifacts, according to one embodiment of the present invention.

FIG. 11 illustrates arrangements of translated shading samples to reduce level of detail artifacts, according to one embodiment of the present invention. Here, group of quads 1100 include two quads, quad ("1") 1102 and quad ("2") 1104. Among translated shading sample positions 1120 are spatial arrangements of shading sample positions, such as those in arrangement 1110 and adjacent arrangement 1112. In accordance with the various embodiments of the present invention, similarly shaped arrangements 1110 and 1112 have common dimensions such that length ("L1") is equal to length ("L3"). As arrangements 1110 and 1112 share similar dimensions, they can be juxtaposed without causing mismatched LODs that generally give rise to LOD artifacts due to mismatched resolutions. Although arrangements 1110 and 1112 are shown as squares, which "fit" or match well with other squares in deterring LODs, those arrangements need not be limited to squares and can be any number of polygonal shapes having similar and/or symmetric dimensions.

Figure 12A:
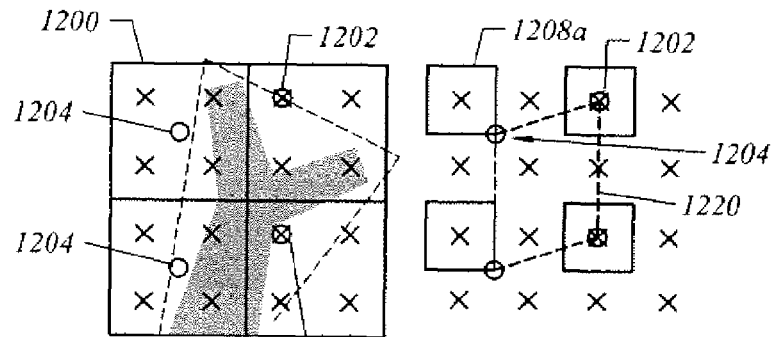
FIGS. 12A to 12D illustrate another technique for subpixel shifting in accordance with yet another embodiment of the present invention.
Figure 12B:
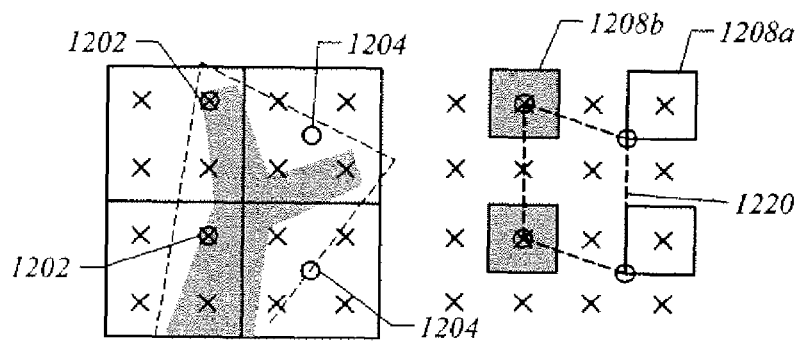
Figure 12C:
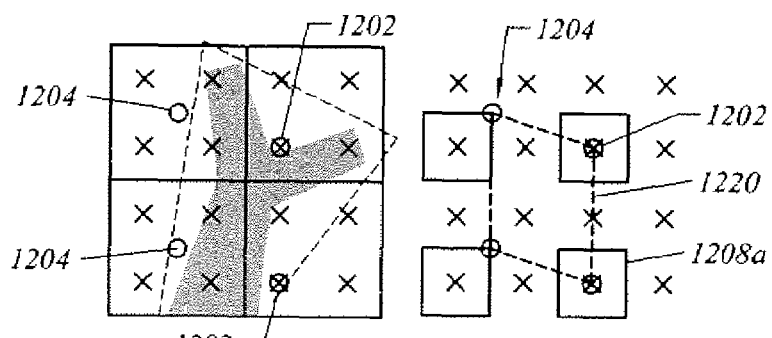
Figure 12D:
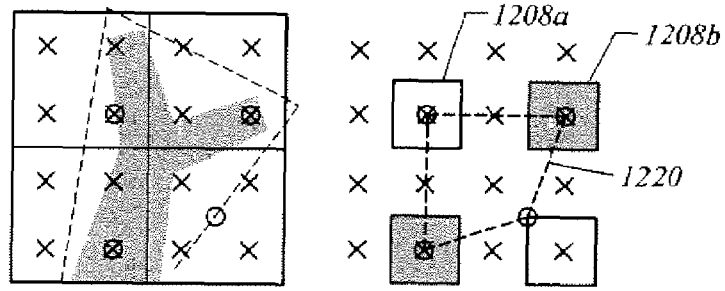

FIGS. 12A to 12D illustrate another technique for subpixel shifting in accordance with yet another embodiment of the present invention. FIGS. 12A, 12B, 12C and 12D respectively depict shading sample positions being established in the top left, top right, bottom left and bottom right quadrants in each pixel of a quad. In this technique, covered sample positions of a quad 1200 are configured to coincide with translated shading sample positions 1202, whereas uncovered coverage sample positions 1204 remain at default shading sample positions. Typical implementations of multisampling locate these default shading sample positions at the centers of pixels. Subpixels 1208a of FIGS. 12A to 12D are shaded with a color that is not that of texture 1222 (i.e., white), whereas subpixels 1208b of FIGS. 12B and 12D are shaded according to texture 1222 (i.e., black). As shown in FIG. 12A, default shading sample positions 1204 and translated shading sample positions 1202 both form arrangement 1220. This arrangement has a rhomboidal shape. Note that this kind of shape might reduce LOD artifacts somewhat if it is repeated over a number of quads. But note that in FIG. 12D, arrangement 1220 is irregularly-shaped, which does not readily reduce LOD artifacts. Irregularly-shaped arrangements are depicted further in FIG. 13.

Figure 13:
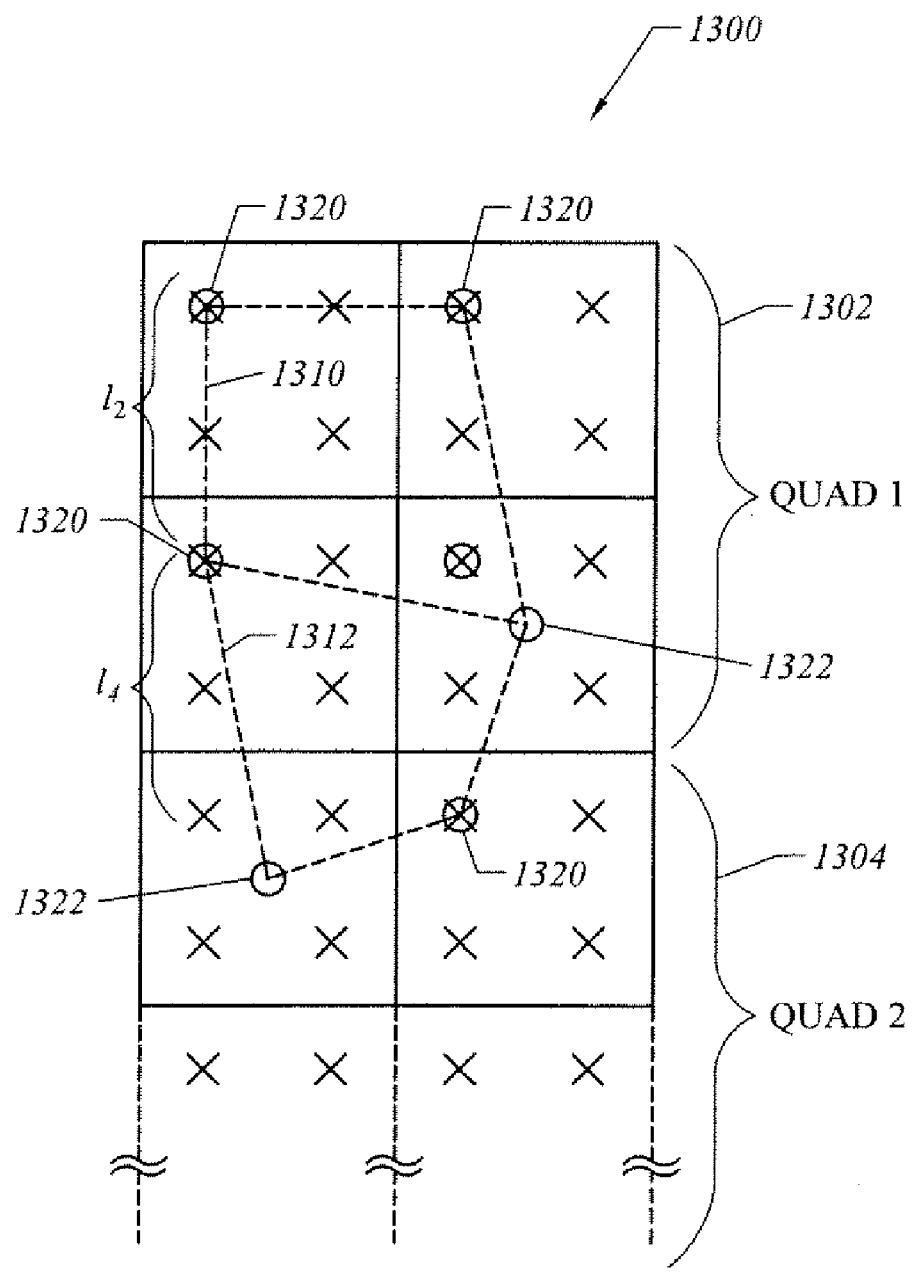
FIG. 13 illustrates arrangements of a mixture of translated shading samples positions and default shading sample positions, according to another embodiment of the present invention.

FIG. 13 illustrates arrangements of a mixture of translated shading samples positions and default shading sample positions, according to another embodiment of the present invention. In this example, group of quads 1300 include at least two quads, quad ("1") 1302 and quad ("2") 1304. Between translated shading sample positions 1320 and default shading sample positions 1322 are arrangement 1310 and adjacent arrangement 1312. In this embodiment, arrangement 1310 is dissimilar in shape to that of arrangement 1312. As such, arrangements 1310 and 1312 have dissimilar dimensions with length ("L2") being shorter than length ("L4"). LOD artifacts therefore can arise when arrangement 1310 is associated with a coarser LOD than arrangement 1312 when both arrangements are juxtaposed. While mixing default shading sample positions and translated shading sample positions can lead to LOD artifacts, this technique still has advantages over conventional jitter-based anti-aliasing techniques, such as maintaining relatively constant depth values.

Figure 14:
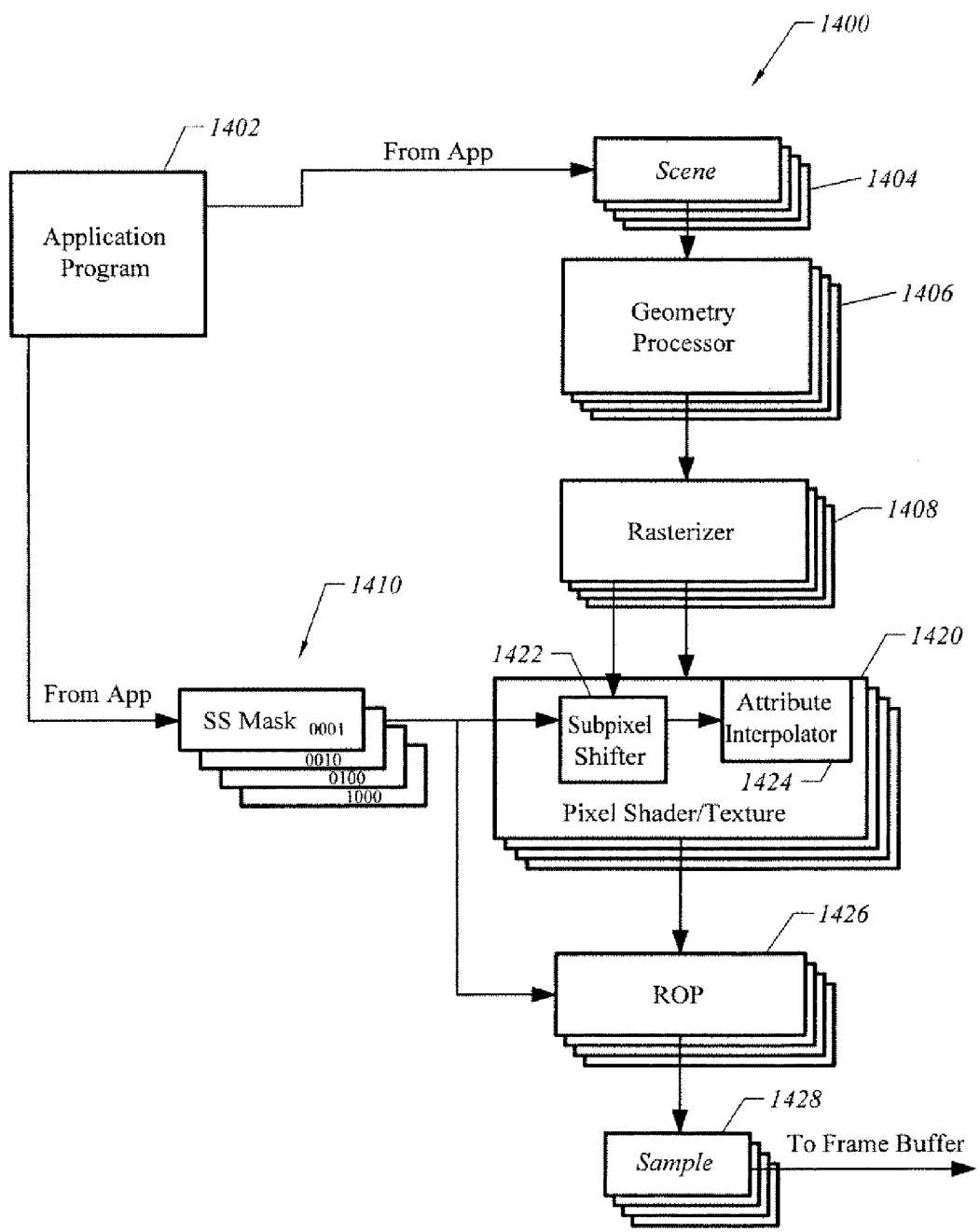
FIGS. 14 to 19 are block diagrams and flow diagrams respectively representing graphics pipeline structures and methods that implement subpixel shifting of sample positions, according to various embodiments of the present invention.

FIGS. 14 to 19 are directed toward a number of representative graphics pipeline structures and methods for implementing subpixel shifting of sample positions, according to various embodiments of the present invention. FIG. 14 is a block diagram illustrating an exemplary graphics pipeline implementing a subpixel shifter, according to an embodiment of the present invention. Graphics pipeline 1400 includes at least a geometry processor 1406, a rasterizer 1408, a pixel shader/texture unit 1420, which combines the functionality of shading and texturizing, and a raster operations ("ROP") unit 1426, all of which operate to anti-alias non-geometric (and geometric) portions of computer-generate objects. A processor (not shown), such as a central processing unit ("CPU") or a general purpose graphics processing unit ("GPGPU"), executes instructions of an applications program 1402 to generate data representing one or more scenes 1404. The processor also executes instructions of applications program 1402 to provide subpixel shifting masks ("SSMask") 1410. Graphics pipeline 1400 receives both scenes 1404 and subpixel shifting masks 1410 to generate subpixel samples 1428 to form anti-alias pixels, which are thereafter typically stored in a frame buffer.

Specifically, applications program 1402 can include executable instructions, such as vertex program instructions, fragment program instructions and the like, that generate geometry data to render images as scenes 1404. The geometry data typically includes vertex coordinates and shading information for one or more geometries or polygons that are used to render a collection of pixels as an object. Any of a number of known techniques for generating geometry data can be implemented to generate geometry data for scenes 1404. Geometry processor 1406 receives the geometry data for each scene 1404 and performs various transformations on that data. For example, geometry processor 1406 can transform lighting, coordinates (e.g., viewing space coordinates (x, y) and depth (z) coordinates), and can implement other known transformation techniques. Geometry processor 1406 provides transformed geometry data to rasterizer 1408, which in turns converts that data into pixel and subpixel data. In some embodiments, geometry processor 1406 and rasterizer 1408 constitute a front end unit that can at least compute coverage of geometries over coverage sample positions.

Rasterizer 1408 then passes the pixel data, which can be in the form of fragments (i.e., includes subpixel color values, depth values and the like), to pixel shader/texture unit 1420 to calculate effects on a per-pixel or a per-subpixel basis. In particular, pixel shader/texture unit 1420 is configured to perform texture mapping requiring interpolation of, for example, texture coordinates and other attributes and to determine shading at shading sample positions, which can be set forth in accordance with multisampling techniques. As shown, pixel shader/texture unit 1420 includes a subpixel shifter 1422 and an attribute interpolator 1424. In some embodiments, subpixel shifter 1422 is configured to selectably operate to either perform multisampling or to perform subpixel shifting to anti-alias portions (e.g., non-geometric portions) of a computer-generated object. Note that subpixel shifter 1422 can shift any number of subgroupings of shading sample positions to effectuate any degree of anti-aliasing (e.g., if there are 8 shading sample positions selected, then anti-aliasing is 8×). Note further that subpixel shifter 1422 is configured to maintain substantially constant depth values for geometries at each of shading sample position, thereby dispensing with a requirement to reconcile varying depth values that arise when shifting geometries rather than shading sample positions.

Subpixel shifter 1422 is configured, in this example, to shift shading sample positions relative to a frame of reference that includes geometries and the coverage sample positions such that there is no relative motion or translation between the geometries and the coverage sample positions. That is, the geometries remain fixed with respect to coverage sample positions used to detect coverage. Modification of shading sample positions are therefore relative to the fixed geometries. Again, this maintains relatively constant depth values. Attribute interpolator 1424, among other things, is configured to interpolate attributes, such as color/shading and texture, by interpolating coordinates between view space (i.e., a screen) and texture maps. Note that to pixel shader/texture unit 1420 is configured in some embodiments to determine shading at the coverage sample positions rather than at default sample positions, such as at the centers of pixels (which is the default for multisampling). By sampling texture and/or shading at the coverage sample positions, more accurate interpolation between screen coordinates and texture coordinates is achieved, thereby ensuring consistency of values of level of detail ("LOD") over adjacent groupings of pixels that constitute a computer-generate object or image. Then, subpixels (or fragments) are passed on to ROP unit 1426 to perform additional operations, such as alpha-testing, depth-testing, down-filtering or "blending," and the like. Each of the subpixels ("samples") 1428 exiting graphics pipeline 1400 can be stored in a frame buffer.

In operation, application program 1402 renders the same scene 1404 (or an object therein) a number of times equivalent to the number of shading sample positions at which shading is sampled. Accordingly, scene 1404 is rendered scene 1404 via graphics pipeline 1400 for each subpixel shifting mask 1410 so that each subpixel of a pixel will be selected to shift a shading sample position to a coverage sample position. So each subset of shading sample positions and corresponding subpixels are serially processed by graphics pipeline 1400. For example, if a first mask selects a top left subpixel of each pixel, then graphics pipeline 1400 processes each top left subpixel for the pixels of a computer-generated object. As another example, consider that a computer-generated image is to be rendered to a quad of pixels, such as shown in FIGS. 10A to 10D. Where four subpixels are to be shaded, then scene 1404 is rendered four times where different subpixel shifting masks are used, such as those in column 1006 of FIGS. 10A to 10D. Further, consider that ROP 1426 applies an alpha test. If an alpha value for a sampled shading of a particular subpixel is less than a threshold (e.g., an alpha value of ⅜), then that subpixel and its shading are discarded (i.e., are sampled out) in the final determination of an oversampled, anti-aliased pixel. During alpha testing, an alpha value of 1 represents an opaque portion of an image and an alpha value of 0 represents transparency. Fractional values, such as ⅜, can be used to anti-alias texture along either geometric or non-geometric edges, or both.

Figure 15:
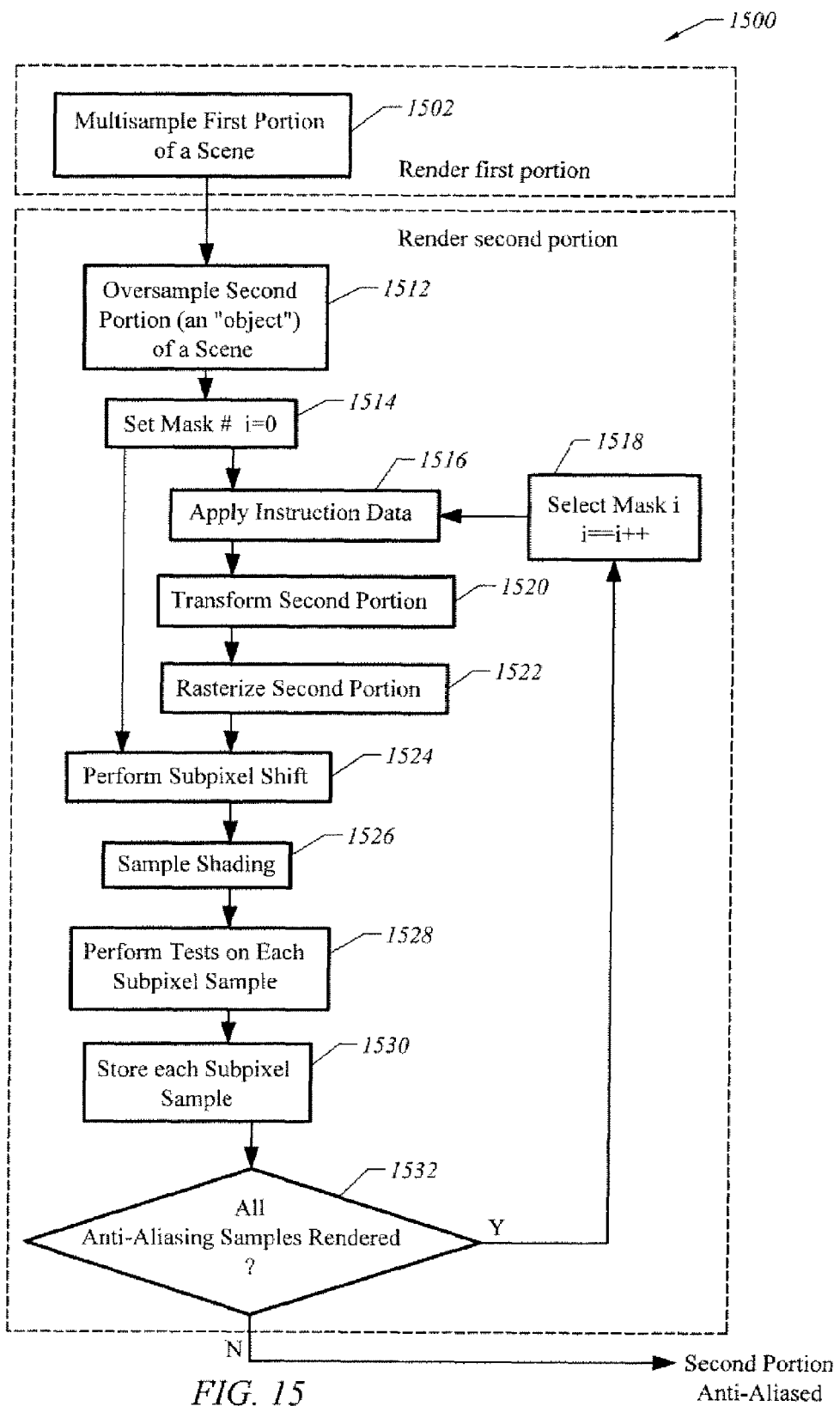

FIG. 15 is a flow diagram representing a method for implementing graphics pipeline of FIG. 14, according to an embodiment of the present invention. Flow 1500 depicts operation of graphics pipeline 1400 in the context of performing multipass rendering during which a first portion of a scene that includes a distant background object, such as a mountain range. Background objects generally can be rendered with a relatively low number of tessellated geometries as the surface and other visual features are not too complicated. Such objects therefore are generally associated with a coarse level of detail ("LOD"). Multisampling the first portion of a scene is accomplished at 1502, where a single shading sample position for each pixel of the mountain range is sufficient and introduces no artifacts. But next consider that a second portion of the scene is a foreground object, such as a twig positioned in front of the distant mountain range. Foreground objects generally are rendered with a relatively high number of tessellated geometries as the surface and other visual features require minute details that are visually perceptible. For example, a twig can have a randomly-shaped surface such as a wood-grain textured surface. Thus, foreground objects therefore are generally associated with a fine level of detail ("LOD"). To capture the detailed features of the foreground object, oversampling of the second object is implemented at 1512. Further, oversampling also reduces texture aliasing between coarse LODs and fine LODs along the interface (or edge) between the foreground and background objects.

At 1514, a first subpixel shifting mask (i.e., mask 0) is determined for selecting a first subset of sample positions (e.g., in top left subpixels). Applications program instruction data, which represents geometry data 1516, is applied to the graphics pipeline, followed by transformation of the geometries constituting the second portion, at 1520, and rasterization of those same geometries at 1522. At 1524, a graphics pipeline performs subpixel shifting to shift shading sample positions selected by the mask at 1514, with shading for those samples being sampled (and associated to subpixels) at 1526. Optionally, raster operations (such as alpha testing and/or blending) occur at 1528 with each subpixel sample being stored in a frame buffer at 1530. So long as other subpixels remain unshaded at 1532, flow 1500 continues to 1518, where a next mask is selected (e.g., a mask number "i" is incremented by one). Thereafter, flow 1500 continues from 1516 to 1532 with the applications program instruction data being applied again to the graphics pipeline. After all subpixels have been sampled, then at least the second portion is anti-aliased.

Figure 16:
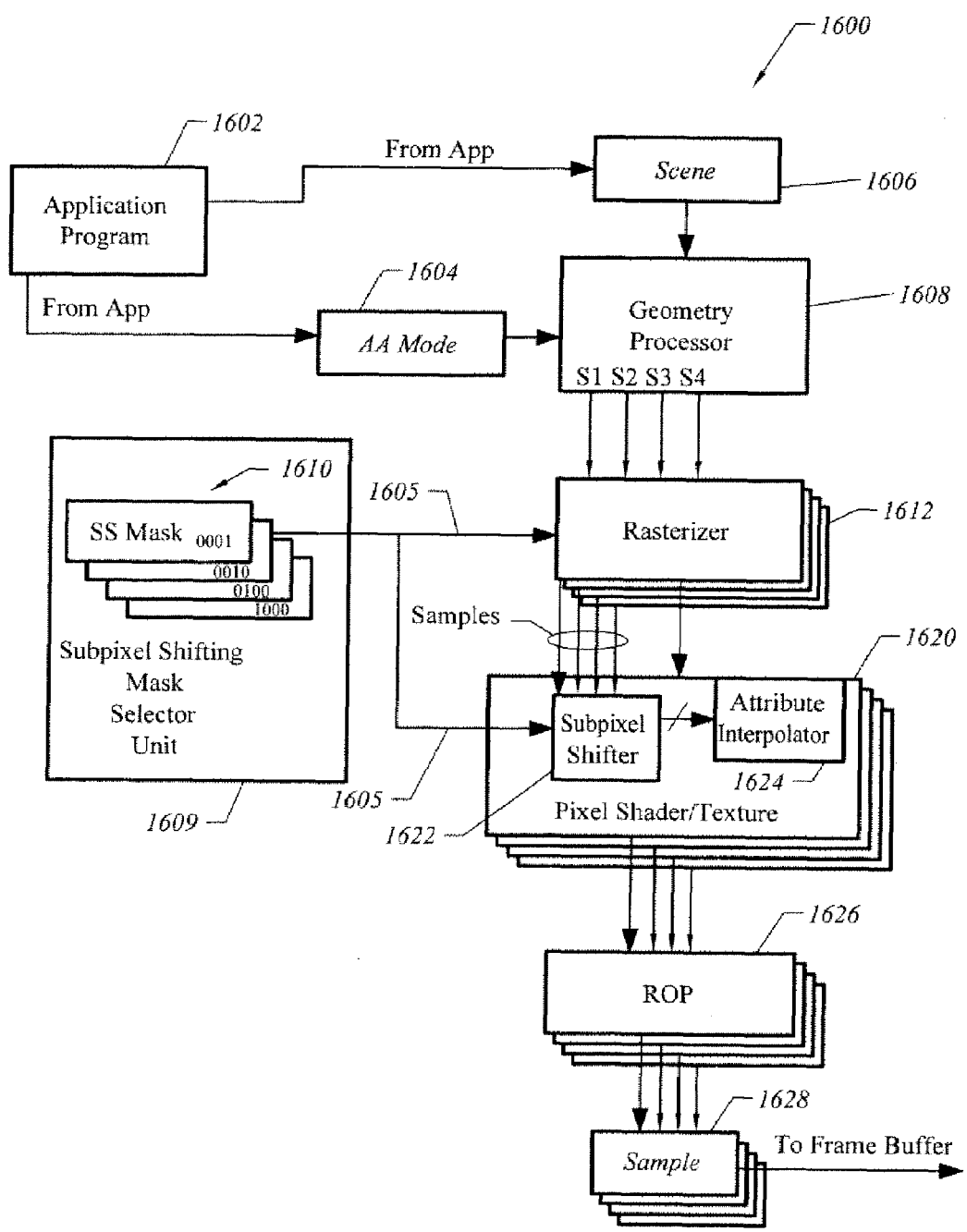

FIG. 16 is a block diagram illustrating another exemplary graphics pipeline implementing a subpixel shifter, according to a specific embodiment of the present invention. Graphics pipeline 1600 includes at least a geometry processor 1608, a rasterizer 1612, a pixel shader/texture unit 1620, and a raster operations ("ROP") unit 1626. As shown, pixel shader/texture unit 1620 includes a subpixel shifter 1622 and an attribute interpolator 1624. Each component of FIG. 16 has at least a structure and/or at least a function equivalent to those similarly-named elements in FIG. 14. Graphics pipeline 1600, however, includes an anti-aliasing mode selector unit 1604 configured to enable subpixel shifter 1622 to effectuate oversampling in accordance with various embodiments of the present invention. In particular, anti-aliasing mode selector unit 1604 is coupled to geometry processor 1608 to initiate generation of multiple copies (e.g., S1, S2, S3, and S4) of the geometries of the single scene or object therein. Graphics pipeline 1600 also includes a subpixel shifting mask selector unit 1609 coupled via bus 1605 to a mask input for providing each of a number of subpixel shifting masks 1610. In some embodiments subpixel shifting mask selector unit 1609 can be implemented as a state machine to cycle or loop through each mask.

In operation, application program 1602 renders the scene 1606 (or an object therein) only once for each instance of oversampling. Applications program 1602 can include an executable instruction to reset a flag associated with anti-aliasing mode selector unit 1604 to zero. Anti-aliasing mode selector unit 1604 detects the zero flag and thus configures geometry processor 1608 to bypass generation of copies of scene 1606 and configures subpixel shifter 1622 to perform multisampling. In this mode, subpixel shifter 1622 does not use any of subpixel shifting masks 1610. But consider that applications program 1602 has an executable instruction that sets the flag to one. When anti-aliasing mode selector unit 1604 detects the one flag, it configures geometry processor 1608 to generate multiple copies of the geometries for scene 1606 (or a portion thereof) and configures subpixel shifter 1622 to perform oversampling. In this mode, subpixel shifter 1622 applies each of subpixel shifting masks 1610 against a unique copy of the geometries for scene 1606, either in parallel or in series, or a combination thereof. Subsequent to subpixel shifter 1622 shifting each sample position, the sampled shading values for each subpixel is passed in parallel to ROP 1626 and then stored as subpixel samples 1628 in a frame buffer.

Figure 17:
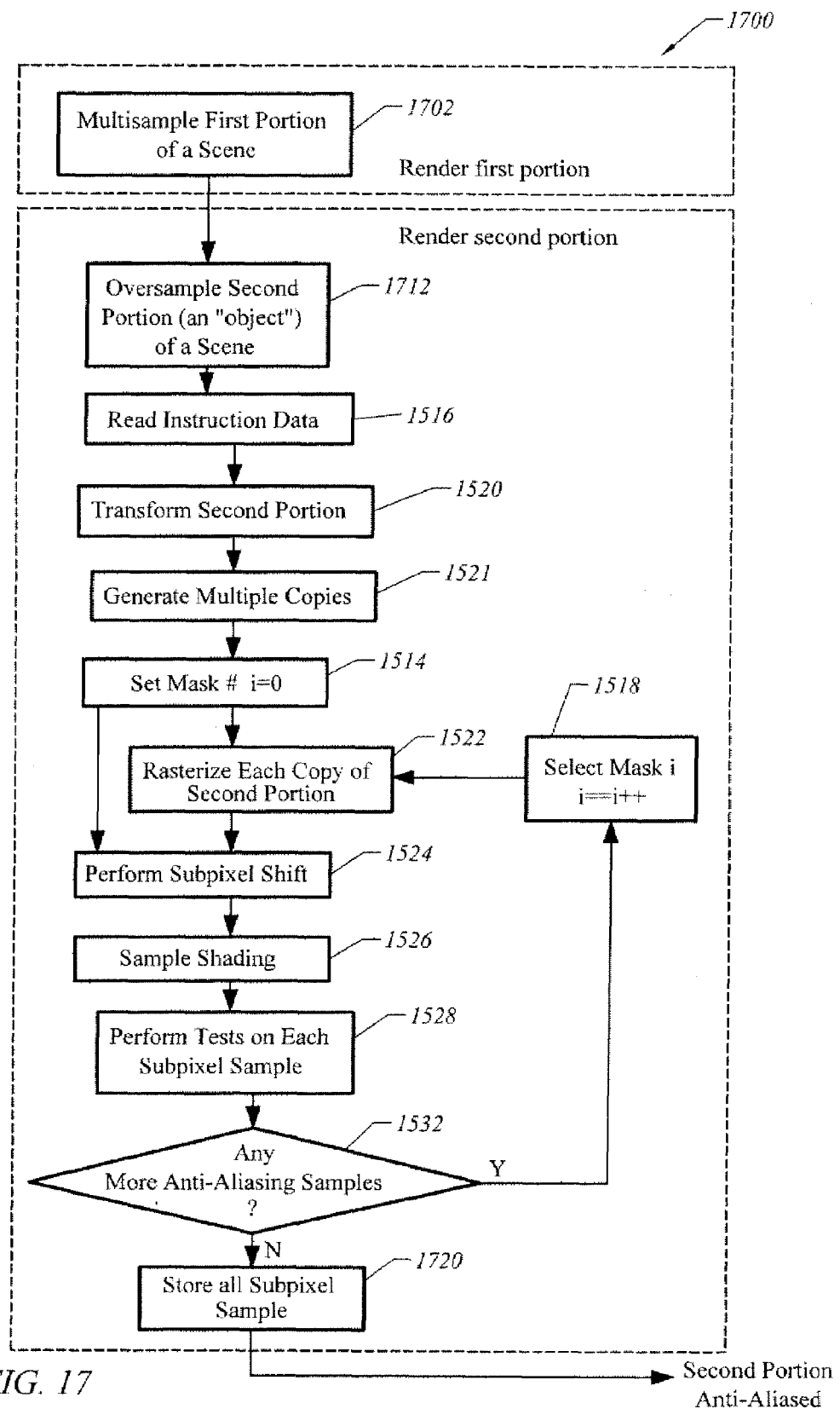

FIG. 17 is a flow diagram representing another method for implementing graphics pipeline of FIG. 16, according to another embodiment of the present invention. Flow 1700 depicts operation of graphics pipeline 1600, again in the context of performing multipass rendering during which a first portion of a scene that includes a distant background object. Multisampling the first portion of a scene is accomplished at 1702, where a single shading sample position for each pixel of the mountain range is sufficient and introduces no artifacts. But consider that a second portion of the scene is a foreground object, such as a twig positioned in front of the distant mountain range. To capture the detailed features of the foreground object, oversampling of the second object is implemented at 1712. Flow 1700 includes functions equivalent to functions 1516 to 1532 of FIG. 15, but includes a different order in the flow and some new functions. For example, a multiple number of copies of a scene are generated at 1521 and then each is rasterized at 1522. According to this flow, the geometries for the second portion are transformed only once, but are rasterized multiple times. Flow 1700 performs subpixel shifting on each copy at 1524, followed by sample shading 1526. Flow continues from 1528 to 1518. Note that flow 1700 can perform functions 1514 to 1528 in series or in parallel. If performed in parallel, then all subpixel samples can be stored in 1720 together in a frame buffer. Advantageously, the looping of functions 1514 to 1528 can be performed automatically without requiring an applications developer to loop through specific application program instructions to perform oversampling by cycling through functions 1514 to 1528.

Figure 18:
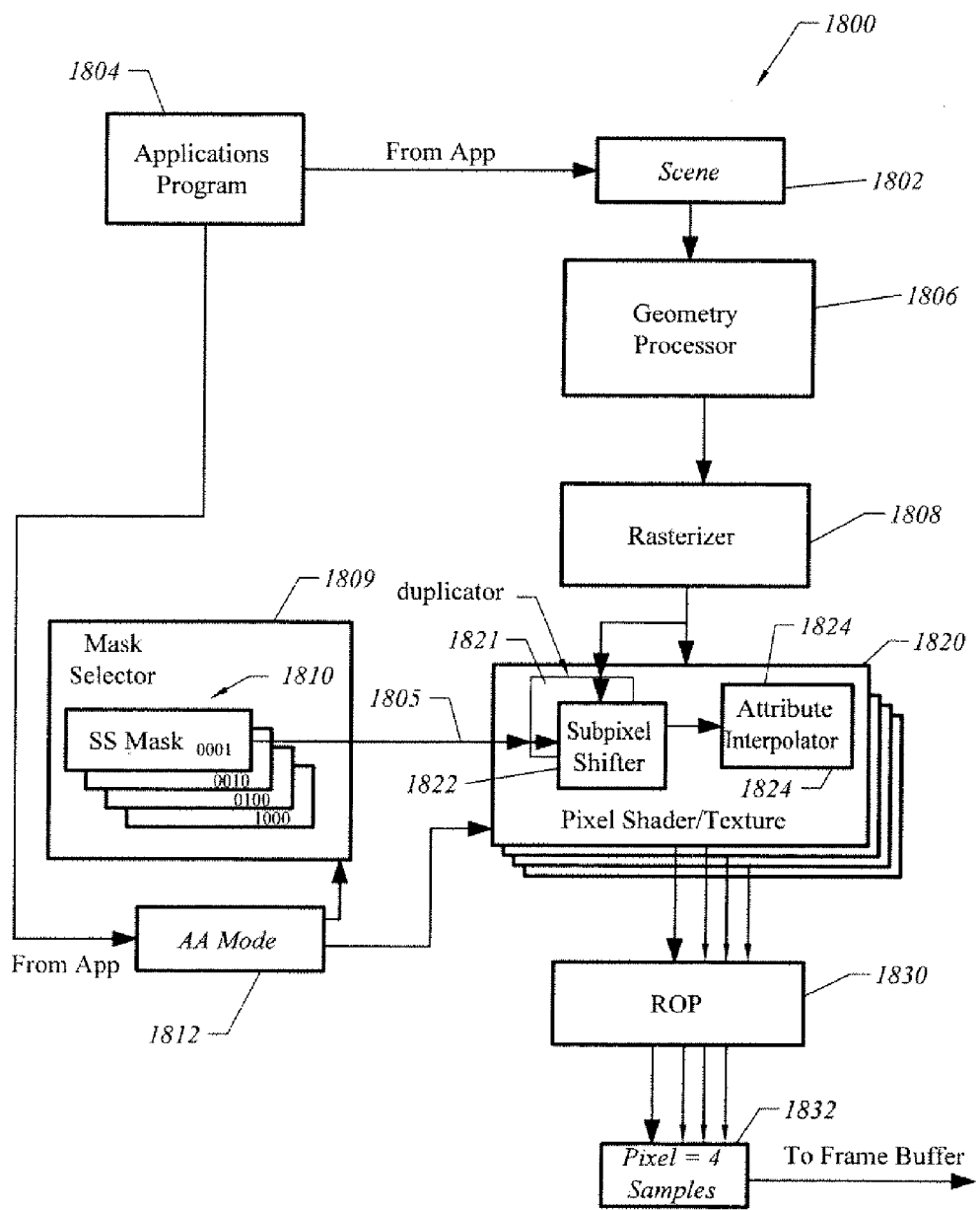

FIG. 18 is a block diagram illustrating yet another exemplary graphics pipeline implementing a subpixel shifter, according to another specific embodiment of the present invention. Graphics pipeline 1800 includes a geometry processor 1806, a rasterizer 1808, a pixel shader/texture unit 1820, and a raster operations ("ROP") unit 1830. As shown, pixel shader/texture unit 1820 includes a subpixel shifter 1822, a duplicator unit 1821 and an attribute interpolator 1824. Each component of FIG. 18 has at least a structure and/or at least a function equivalent to those similarly-named elements in FIG. 16. Graphics pipeline 1800, however, includes duplicator unit 1821 that is configured to duplicate rasterized geometries received from rasterizer 1808 to enable subpixel shifter 1822 to effectuate oversampling in accordance with various embodiments of the present invention. In particular, anti-aliasing mode selector unit 1812 is coupled to duplicator unit 1821 to initiate generation of duplicate copies of the geometries for the single scene or object therein. Graphics pipeline 1800 also includes a subpixel shifting mask selector unit 1809 coupled via a bus 1805 to mask input for providing each of a number of subpixel shifting masks 1810.

In operation, application program 1804 renders the scene 1802 (or an object therein) only once for each instance of oversampling. Applications program 1804 can include executable instructions to reset or set a flag associated with anti-aliasing mode selector unit 1812 to both operate duplicator unit 1821 and subpixel 1822 either in a multisampling mode (i.e., bypass generation of duplicates of scene 1802) or in oversampling mode. In oversampling mode (i.e., anti-aliasing mode), subpixel shifter 1822 applies each of subpixel shifting masks 1810 against a unique duplicate of the rasterized geometries for scene 1802, either in parallel or in series, or a combination thereof. Subsequent to subpixel shifter 1822 shifting sample positions, the sampled shading values for each subpixel optionally can be passed to ROP unit 1830 and then stored as subpixel samples 1832 in a frame buffer. Advantageously, the generation of duplicate versions of a second portion of scene 1802 is performed in pixel shader/texture unit 1820, thereby preserving computational resources of rasterizer 1808 and ROP unit 1830.

Figure 19:
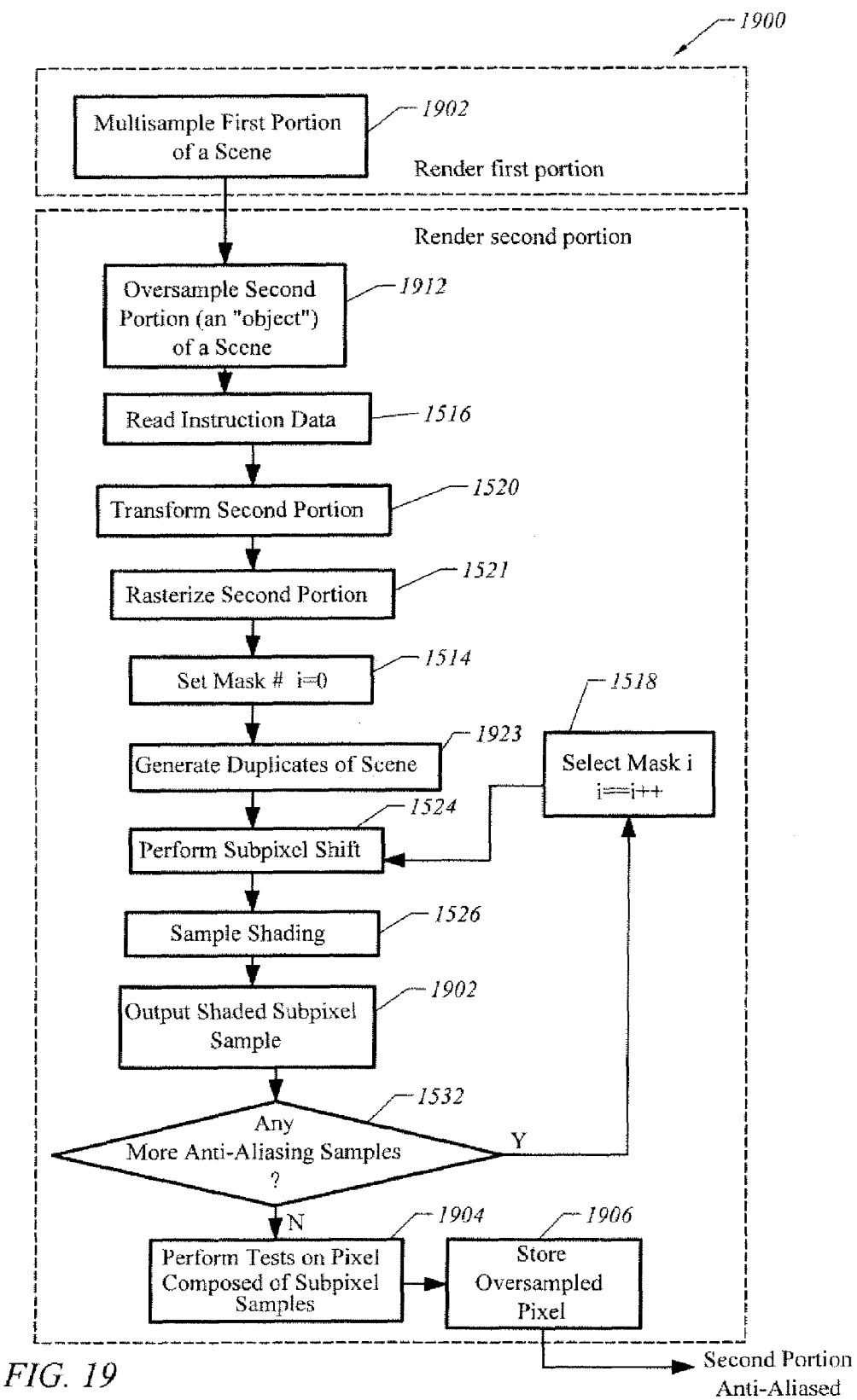

FIG. 19 is a flow diagram representing yet another method for implementing graphics pipeline of FIG. 18, according to another embodiment of the present invention. Flow 1900 depicts operation of graphics pipeline 1800, again in the context of performing multipass rendering during which a first portion of a scene that includes the distant background object. Multisampling the first portion of a scene is accomplished at 1902, where a single shading sample position for each pixel of the distant mountain range of the previous example is sufficient and introduces no artifacts. But again consider that a second portion of the scene is the foreground object, such as the previously-described twig that is positioned in front of the distant mountain range. To capture the detailed features of the foreground object, oversampling of the second object is implemented at 1912. Flow 1900 includes functions equivalent to functions 1516 to 1532 of FIGS. 15 and 17, but includes a variant flow. For example, a number of duplicate copies of the second portion of scene 1802 are generated at 1923. According to this flow, the geometries for the second portion are both transformed and rasterized only one time. Then, flow 1900 performs subpixel shifting on each duplicate at 1524, followed by sample shading 1526. Flow continues from 1902 to 1518. At 1902, shaded subpixels can be output as a single sample or a single packet of pixel fragment information. Note that flow 1700 can perform functions 1524 to 1518 in series or in parallel. If performed in parallel, then all subpixel samples can be optionally tested at 1904 and then stored as a single oversampled pixel at 1906 in a frame buffer.

In a specific embodiment, any of graphic pipelines 1400, 1600 and 1800 can perform oversampling to anti-alias a first portion by determining shading during a first multipass-rendering pass for the first object. As an example, consider that the first portion is composed of a relatively high number of tessellated geometries associated with a fine LOD. Then, consider that switching to multisampling is desired to minimize the use of computational resources. In particular, any of graphic pipelines 1400, 1600 and 1800 then can perform multisampling on a second object during a second multipass-rendering pass during which modified shading, such as shadows, composite lighting, and the like, are applied to the second object. Note that during the first multipass-rendering pass and the second multipass-rendering pass the pipelines maintain substantially constant depth values for shading sampled at the shading sample positions, thereby reducing computational overhead otherwise used to reconcile mismatched depth values due to shifting the geometries rather than shading sample positions.

In view of the foregoing, a graphics processing system can implement a subpixel shifter using multisampling to simulate shifting of subpixel for anti-aliasing texture on a per-object basis rather than conventionally supersampling an entire frame, thereby preserving computational resources. Note that in some embodiments, a subpixel shifter can reside in a graphics pipeline and the graphics processing system can be a general purpose graphics processing unit ("GPGPU"). Also note that selection of coverage sample positions and/or subpixel subpixels for which texture will be sampled can either in parallel or serial, or a combination thereof (i.e., some in parallel and others in serial).

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. An apparatus for anti-aliasing a computer-generated object in a graphics pipeline configured to execute instructions of an applications program to generate geometry data representing geometries, said apparatus comprising:

a pipeline front end unit configured to at least determine coverage of said geometries over coverage sample positions;

a subpixel shifter configured to shift shading sample positions relative to a frame of reference that includes said geometries and said coverage sample positions such that there is no relative translation of said geometries with respect to said coverage sample positions; and a texture unit configured to determine shading at each of said subsets of shading sample positions, wherein said subpixel shifter is configured to shift each of said shading sample positions to a respective coverage sample position in a pixel for anti-aliasing said computer-generated object; and wherein said subpixel shifter aligns said shading sample positions with said coverage samples to produce symmetrical arrangements of said shading sample positions over groupings of pixels, thereby reducing mismatched values of level of detail ("LOD") that otherwise would introduce LOD artifacts.

2. The apparatus of claim 1 wherein said subpixel shifter further comprises a mask input to receive subpixel shifting masks for selecting subsets of shading sample positions of said shading sample positions.

3. The apparatus of claim 2 wherein one or more instructions of said applications program include an instruction to execute centroid sampling to enable said subpixel shifter to selectably shift each of said subsets of shading sample positions for translation relative to said frame of references wherein each of said subsets of shading sample positions are shifted in series as said applications program submits a scene into said graphics pipeline a number of times equivalent to the number of said subsets being shifted.

4. The apparatus of claim 3 further comprising:

a raster operations ("ROP") unit configured to serially receive information for groups of subpixels associated with each of said subsets of shading sample positions, said information at least including shading and depth values, said raster operations unit being configured to at least perform alpha-testing serially on each of said groups of subpixels; and a frame buffer for storing said groups of subpixels.

5. The apparatus of claim 2 further comprising:

a subpixel shifting mask selector unit coupled to said mask input to provide each of said subpixel shifting masks; and an anti-aliasing mode selector unit configured to enable said subpixel shifter to perform oversampling.

6. The apparatus of claim 5 wherein said anti-aliasing mode selector unit is coupled to said pipeline front end unit to generate of multiple copies of said geometries from a single scene, and to provide said multiple copies in parallel from said pipeline front end unit to said subpixel shifter for shifting each of said subset of shading sample positions in approximate synchronicity.

7. The apparatus of claim 5 further comprising a duplicator unit coupled to said subpixel shifter and configured to locally generate multiple copies of said geometries from a single scene, and to provide said multiple copies to said subpixel shifter to shift each of said subset of shading sample positions.

8. The apparatus of claim 7 further comprising a pixel shader that includes said duplicator unit and said subpixel shifter, said pixel shader configured to provide at least shading values for groups of subpixels associated with each of said subsets of shading sample positions, wherein said anti-aliasing mode selector unit is coupled to said subpixel shifter to selectively shift each of said subset of shading sample positions for said geometries if oversampling is selected.

9. The apparatus of claim 1 wherein said texture unit is further configured to determine shading at said coverage sample positions rather than at default sample positions to facilitate accurate interpolation between screen coordinates and texture coordinates, thereby ensuring consistency of values of LOD over adjacent groupings of pixels of said computer-generate object.

10. The apparatus of claim 1 wherein said subpixel shifter further comprises a subpixel centroid sampling unit configured to establish centroids at only coverage sample positions.

11. The apparatus of claim 10 wherein said centroid sampling unit is configured to shift said shading sample positions to locations of said coverage sample positions without said applications program specifying either said locations or subpixel shift amounts, or both, thereby obviating manual determination of both said locations and said subpixel shift amounts.

12. The apparatus of claim 1 wherein said subpixel shifter performs multisampling when in a first state and performs oversampling of at least a portion of said computer-generated object using said subpixel shifter when in a second state, thereby enabling effective use of both multisampling and oversampling during multi-pass rendering.

13. The apparatus of claim 12 wherein said subpixel shifter is selectably operable to either configure said subpixel shifter to perform multisampling or to configure said subpixel shifter to perform oversampling of said non-geometric portions of said computer-generated object, wherein said subpixel shifter is configured to shift any number of subsets of said shading sample positions to effectuate any degree of anti-aliasing, wherein said subpixel shifter is configured to maintain substantially constant depth values of said geometries at each of said shading sample positions, thereby dispensing with a requirement to reconcile varying depth values that arise when shifting said geometries.

14. The apparatus of claim 13 wherein a first degree of anti-aliasing includes oversampling both coverage and shading four times per pixel, and a second degree of anti-aliasing includes oversampling coverage two times per pixel and multisampling shading two times per pixel.

15. A method for selectably performing multisampling and oversampling to sample shading for geometries of a computer-generated object, said method comprising:

multisampling a first portion of a scene to determine one shading value per pixel; and oversampling a second portion of said scene by shifting shading sample positions relative to a frame of reference that includes said geometries and coverage sample positions such that there is no relative translation between said geometries and said coverage sample positions, said shading sample positions being shifted to provide multiple shading values per pixel, wherein said shading sample positions are shifted to establish translated shading sample positions coinciding with said coverage sample positions to reduce aliasing of non-geometric portions of said computer-generated object; and wherein said shading sample positions are aligned with said coverage samples to produce symmetrical arrangements of said shading sample positions over groupings of pixels, thereby reducing mismatched values of level of detail ("LOD") that otherwise would introduce LOD artifacts.

16. The method of claim 15 wherein multisampling said first portion comprises:

determining shading for a background object composed of tessellated geometries associated with a coarse level of detail ("LOD"), and oversampling said second portion comprises:

determining shading for a foreground object composed of tessellated geometries associated with a fine LOD, wherein oversampling reduces texture aliasing between said coarse LOD and said fine LOD.

17. The method of claim 15 wherein oversampling said second portion comprises:
determining shading during a first multipass-rendering pass for an object composed of tessellated geometries associated with a fine LOD, and multisampling said object during a second multipass-rendering pass comprises:
applying modified shading,
wherein said first multipass-rendering pass and said second multipass-rendering pass maintain substantially constant depth values for shading sampled at said shading sample positions, thereby reducing computational overhead otherwise used to reconcile mismatched depth values due to shifting said geometries.

18. The method of claim 15 wherein oversampling said second portion of said scene comprises performing for each subpixel constituting said second portion:
selecting one of a number of subpixel shifting masks;
transforming a number of geometries constituting said second portion;
rasterizing said number of geometries;
shifting shading sample positions associated with a subset of said shading sample positions, each subset being associated with different coverage sample positions;
sampling shading to derive shading values at said subset of said shading sample positions;
storing said shading values in a frame buffer; and
repeating for other subpixel shifting masks:
transforming, rasterizing, shifting shading sample positions, sampling shading, and storing shading values.

19. The method of claim 15 wherein oversampling said second portion of said scene comprises:
transforming a number of geometries constituting said second portion;
selecting a number of subpixel shifting masks;
rasterizing said number of geometries a number of times equivalent to said number of subpixel shifting masks;
shifting shading sample positions associated with a subset of said shading sample positions, each subset being associated with unique coverage sample positions;
sampling shading to derive shading values at said subset of said shading sample positions;
storing said shading values in a frame buffer; and
repeating for other subpixel shifting masks:
rasterizing, shifting shading sample positions, sampling shading, and storing shading values.

20. The method of claim 15 wherein oversampling said second portion of said scene comprises:
transforming a number of geometries constituting said second portion;
rasterizing said number of geometries;
selecting a number of subpixel shifting masks;
duplicating said number of geometries for each subpixel shifting mask;
shifting shading sample positions associated with a subset of said shading sample positions, each subset being associated with unique coverage sample positions;
sampling shading to derive shading values at said subset of said shading sample positions;
repeating for other subpixel shifting masks until each pixel of said second portion is oversampled:
shifting shading sample positions and sampling shading; and
storing said shading values as an oversampled pixel in a frame buffer.

21. A general purpose graphics processing unit ("GPGPU") comprising:
a geometry processor configured to generate a geometry in accordance with application program instructions;
a rasterizer configured to convert said geometry into data representing coverage of subpixels at coverage sample positions;
a shader to determine shading for subpixels, said shader including:
a subpixel centroid sampling unit configured to perform centroid multisampling, said subpixel centroid sampling unit being configured to receive a number of subpixel shifting masks to either establish a subpixel centroid that coincides with a coverage sample position or reposition a default centroid from a pixel center to said coverage sample position, and
a texture unit configured to determine shading for said geometry using said coverage sample positions; and
a raster operations ("ROP") unit configured to at least perform alpha-testing against said shading for said geometry;
wherein said subpixel centroid sampling unit comprises:
a coverage sample determinator configured to determine a number of covered sample positions that are covered by said geometry and a number of uncovered sample positions that are not covered by said geometry, both covered sample positions and uncovered sample positions sharing a frame of reference with said geometry such that there is no relative shifting among said geometry, said covered sample positions and said uncovered sample positions when anti-aliasing said computer-generated images;
a shading sample selector configured to select either a covered sample position from said number of covered sample positions or an uncovered sample position from said number of uncovered sample positions; and
a shading sample translator configured to establish said subpixel centroid if said covered sample position is selected or to reposition said default centroid if said uncovered sample position is selected,
wherein said subpixel centroid and said default centroid form symmetrically-spaced texture sample positions over a number of pixels to reduce level of detail ("LOD") artifacts.

* * * * *